(12) United States Patent
Richert

(10) Patent No.: US 9,111,226 B2
(45) Date of Patent: Aug. 18, 2015

(54) MODULATED PLASTICITY APPARATUS AND METHODS FOR SPIKING NEURON NETWORK

(71) Applicant: Brain Corporation, San Diego, CA (US)

(72) Inventor: Micah Richert, San Diego, CA (US)

(73) Assignee: Brain Corporation, San Diego, CA (US)

( * ) Notice: Subject to any disclaimer, the term of this patent is extended or adjusted under 35 U.S.C. 154(b) by 267 days.

(21) Appl. No.: 13/660,945

(22) Filed: Oct. 25, 2012

(65) Prior Publication Data

US 2014/0122398 A1    May 1, 2014

(51) Int. Cl.
| | |
|---|---|
| *G06F 15/18* | (2006.01) |
| *G06E 1/00* | (2006.01) |
| *G06E 3/00* | (2006.01) |
| *G06G 7/00* | (2006.01) |
| *G06N 3/02* | (2006.01) |
| *G06N 3/04* | (2006.01) |

(52) U.S. Cl.
CPC . *G06N 3/049* (2013.01); *G06N 3/02* (2013.01)

(58) Field of Classification Search
USPC .......................................................... 706/15
See application file for complete search history.

(56) References Cited

U.S. PATENT DOCUMENTS

| | | | |
|---|---|---|---|
| 5,063,603 | A | 11/1991 | Burt |
| 5,138,447 | A | 8/1992 | Shen et al. |
| 5,216,752 | A | 6/1993 | Tam |
| 5,272,535 | A | 12/1993 | Elabd |

(Continued)

FOREIGN PATENT DOCUMENTS

| | | |
|---|---|---|
| CN | 102226740 A | 10/2011 |
| JP | 4087423 | 3/1992 |

(Continued)

OTHER PUBLICATIONS

Analysis of spatio-temporal patterns in associative networks of spiking neurons Wennekers, T. Artificial Neural Networks, 1999. ICANN 99. Ninth International Conference on (Conf. Publ. No. 470) vol. 1 DOI: 10.1049/cp:19991116 Publication Year: 1999 , pp. 245-250 vol. 1.*

(Continued)

*Primary Examiner* — Michael B Holmes
(74) *Attorney, Agent, or Firm* — Gazdzinski & Associates PC

(57) ABSTRACT

Apparatus and methods for modulated plasticity in a spiking neuron network. A plasticity mechanism may be configured for example based on a similarity measure between post-synaptic activities of two or more neurons that may be receiving the same feed-forward input. The similarity measure may comprise a dynamically determined cross-correlogram between the output spike trains of two neurons. An a priori configured similarity measure may be used during network operation in order to update efficacy of inhibitory connections between neighboring neurons. Correlated output activity may cause one neuron to inhibit output generation by another neuron thereby hindering responses by multiple neurons to the same input stimuli. The inhibition may be based on an increased efficacy of inhibitory lateral connection. The inhibition may comprise modulation of the pre synaptic portion the plasticity rule based on efficacies of feed-forward connection and inhibitory connections and a statistical parameter associated with the post-synaptic rule.

20 Claims, 18 Drawing Sheets

(56) References Cited

U.S. PATENT DOCUMENTS

| | | | |
|---|---|---|---|
| 5,355,435 A | 10/1994 | Deyong et al. |
| 5,638,359 A | 6/1997 | Peltola et al. |
| 5,652,594 A | 7/1997 | Costas |
| 5,673,367 A | 9/1997 | Buckley |
| 5,875,108 A | 2/1999 | Hoffberg |
| 6,009,418 A | 12/1999 | Cooper |
| 6,014,653 A | 1/2000 | Thaler |
| 6,035,389 A | 3/2000 | Grochowski |
| 6,418,424 B1 | 7/2002 | Hoffberg et al. |
| 6,458,157 B1 | 10/2002 | Suaning |
| 6,509,854 B1 | 1/2003 | Morita |
| 6,545,705 B1 | 4/2003 | Sigel et al. |
| 6,545,708 B1 | 4/2003 | Tamayama |
| 6,546,291 B2 | 4/2003 | Merfield et al. |
| 6,581,046 B1 | 6/2003 | Ahissar |
| 6,625,317 B1 | 9/2003 | Gaffin et al. |
| 7,054,850 B2 | 5/2006 | Matsugu |
| 7,580,907 B1 | 8/2009 | Rhodes |
| 7,653,255 B2 | 1/2010 | Rastogi |
| 7,737,933 B2 | 6/2010 | Yamano et al. |
| 7,765,029 B2 | 7/2010 | Fleischer et al. |
| 7,849,030 B2 | 12/2010 | Ellingsworth |
| 8,000,967 B2 | 8/2011 | Taleb |
| 8,015,130 B2 | 9/2011 | Matsugu |
| 8,103,602 B2 | 1/2012 | Izhikevich |
| 8,154,436 B2 | 4/2012 | Szajnowski |
| 8,160,354 B2 | 4/2012 | Paquier |
| 8,200,593 B2 | 6/2012 | Guillen |
| 8,281,997 B2 | 10/2012 | Moran et al. |
| 8,311,965 B2 | 11/2012 | Breitwisch |
| 8,315,305 B2 | 11/2012 | Petre |
| 8,346,692 B2* | 1/2013 | Rouat et al. ............. 706/20 |
| 8,390,707 B2 | 3/2013 | Yamashita |
| 8,416,847 B2 | 4/2013 | Roman |
| 8,467,623 B2 | 6/2013 | Izhikevich |
| 8,515,160 B1* | 8/2013 | Khosla et al. ............. 382/156 |
| 8,583,286 B2 | 11/2013 | Fleischer et al. |
| 8,712,941 B2 | 4/2014 | Izhikevich et al. |
| 8,756,183 B1* | 6/2014 | Daily et al. ............. 706/20 |
| 8,775,341 B1* | 7/2014 | Commons ............. 706/20 |
| 8,793,205 B1* | 7/2014 | Fisher et al. ............. 706/25 |
| 8,943,008 B2* | 1/2015 | Ponulak et al. ............. 706/25 |
| 8,972,315 B2* | 3/2015 | Szatmary et al. ............. 706/15 |
| 8,977,582 B2* | 3/2015 | Richert ............. 706/15 |
| 8,983,216 B2* | 3/2015 | Izhikevich et al. ............. 382/156 |
| 8,990,133 B1* | 3/2015 | Ponulak et al. ............. 706/25 |
| 8,996,177 B2* | 3/2015 | Coenen ............. 700/264 |
| 2003/0050903 A1 | 3/2003 | Liaw |
| 2003/0216919 A1 | 11/2003 | Roushar |
| 2004/0136439 A1 | 7/2004 | Dewberry |
| 2004/0170330 A1 | 9/2004 | Fogg |
| 2004/0193670 A1 | 9/2004 | Langan et al. |
| 2005/0015351 A1 | 1/2005 | Nugent |
| 2005/0036649 A1 | 2/2005 | Yokono et al. |
| 2005/0283450 A1 | 12/2005 | Matsugu |
| 2006/0094001 A1 | 5/2006 | Torre |
| 2006/0129728 A1 | 6/2006 | Hampel |
| 2006/0161218 A1 | 7/2006 | Danilov |
| 2007/0022068 A1 | 1/2007 | Linsker |
| 2007/0176643 A1 | 8/2007 | Nugent |
| 2007/0208678 A1 | 9/2007 | Matsugu |
| 2008/0100482 A1 | 5/2008 | Lazar |
| 2008/0199072 A1 | 8/2008 | Kondo |
| 2008/0201282 A1 | 8/2008 | Garcia et al. |
| 2008/0237446 A1 | 10/2008 | Oshikubo |
| 2009/0043722 A1 | 2/2009 | Nugent |
| 2010/0036457 A1 | 2/2010 | Sarpeshkar |
| 2010/0081958 A1 | 4/2010 | She |
| 2010/0086171 A1 | 4/2010 | Lapstun |
| 2010/0100482 A1 | 4/2010 | Hardt |
| 2010/0166320 A1 | 7/2010 | Paquier |
| 2010/0225824 A1 | 9/2010 | Lazar |
| 2010/0235310 A1 | 9/2010 | Gage et al. |
| 2010/0299296 A1 | 11/2010 | Modha et al. |
| 2011/0016071 A1 | 1/2011 | Guillen |
| 2011/0119214 A1 | 5/2011 | Breitwisch |
| 2011/0119215 A1 | 5/2011 | Elmegreen |
| 2011/0137843 A1 | 6/2011 | Poon et al. |
| 2011/0160741 A1 | 6/2011 | Asano |
| 2012/0011090 A1 | 1/2012 | Tang |
| 2012/0083982 A1 | 4/2012 | Bonefas |
| 2012/0084240 A1 | 4/2012 | Esser et al. |
| 2012/0109866 A1 | 5/2012 | Modha |
| 2012/0303091 A1 | 11/2012 | Izhikevich |
| 2012/0308076 A1 | 12/2012 | Piekniewski |
| 2012/0308136 A1 | 12/2012 | Izhikevich |
| 2013/0046716 A1 | 2/2013 | Chan et al. |
| 2013/0073484 A1 | 3/2013 | Izhikevich |
| 2013/0073491 A1 | 3/2013 | Izhikevich |
| 2013/0073492 A1 | 3/2013 | Izhikevich |
| 2013/0073495 A1 | 3/2013 | Izhikevich |
| 2013/0073496 A1 | 3/2013 | Szatmary |
| 2013/0073498 A1 | 3/2013 | Izhikevich |
| 2013/0073499 A1 | 3/2013 | Izhikevich |
| 2013/0073500 A1 | 3/2013 | Szatmary |
| 2013/0117212 A1 | 5/2013 | Hunzinger et al. |
| 2013/0151450 A1 | 6/2013 | Ponulak |
| 2013/0218821 A1 | 8/2013 | Szatmary |
| 2013/0251278 A1 | 9/2013 | Izhikevich |
| 2013/0297539 A1 | 11/2013 | Piekniewski et al. |
| 2013/0297541 A1 | 11/2013 | Piekniewski et al. |
| 2013/0297542 A1 | 11/2013 | Piekniewski et al. |
| 2013/0325766 A1 | 12/2013 | Petre et al. |
| 2013/0325768 A1 | 12/2013 | Sinyavskiy |
| 2013/0325773 A1 | 12/2013 | Sinyavskiy |
| 2013/0325774 A1 | 12/2013 | Sinyavskiy |
| 2013/0325775 A1 | 12/2013 | Sinyavskiy |
| 2013/0325777 A1 | 12/2013 | Petre et al. |
| 2014/0012788 A1 | 1/2014 | Piekniewski |
| 2014/0016858 A1 | 1/2014 | Richert |
| 2014/0032458 A1 | 1/2014 | Sinyavskiy |
| 2014/0032459 A1 | 1/2014 | Sinyavskiy |
| 2014/0052679 A1 | 2/2014 | Sinyavskiy |
| 2014/0064609 A1 | 3/2014 | Petre et al. |
| 2014/0122397 A1 | 5/2014 | Richert |
| 2014/0122398 A1 | 5/2014 | Richert |
| 2014/0122399 A1 | 5/2014 | Szatmary |
| 2014/0156574 A1 | 6/2014 | Piekniewski |

FOREIGN PATENT DOCUMENTS

| | | |
|---|---|---|
| RU | 2108612 C1 | 10/1998 |
| RU | 2406105 C2 | 12/2010 |
| RU | 2424561 C2 | 7/2011 |
| WO | 2008083335 A2 | 7/2008 |
| WO | 2008132066 A1 | 11/2008 |

OTHER PUBLICATIONS

A Biologically Inspired Spiking Neural Network for Sound Source Lateralization Voutsas, K. ; Adamy, J. Neural Networks, IEEE Transactions on vol. 18, Issue: 6 DOI: 10.1109/TNN.2007.899623 Publication Year: 2007, pp. 1785-1799.*

Feature extraction from spectro-temporal signals using dynamic synapses, recurrency, and lateral inhibition Glackin, C. ; Maguire, L. ; McDaid, L. Neural Networks (IJCNN), The 2010 International Joint Conference on DOI: 10.1109/IJCNN.2010.5596818 Publication Year: 2010, pp. 1-6.*

Modeling cerebellar granular layer excitability and combinatorial computation with spikes Medini, C. ; Subramaniyam, S. ; Nair, B. ; Diwakar, S. Bio-Inspired Computing: Theories and Applications (BIC-TA), 2010 IEEE Fifth International Conference on DOI: 10.1109/BICTA.2010.5645274 Publication Year: 2010, pp. 1495-1503.*

Berkes and Wiskott, Slow feature analysis yields a rich repertoire of complex cell properties. *Journal of Vision* (2005) vol. 5 (6).

Bohte, 'Spiking Nueral Networks' Doctorate at the University of Leiden, Holland, Mar. 5, 2003, pp. 1-133 [retrieved on Nov. 14, 2012]. Retrieved from the internet: <URL: http://holnepages, cwi ,nl1-sbolltedmblica6ond)hdthesislxif>.

Brette et al., Brian: a simple and flexible simulator for spiking neural networks, The Neuromorphic Engineer, Jul. 1, 2009, pp. 1-4, doi: 10.2417/1200906.1659.

(56) References Cited

OTHER PUBLICATIONS

Cessac et al. 'Overview of facts and issues about neural coding by spikes.' Journal of Physiology, Paris 104.1 (2010): 5.
Cuntz et al., 'One Rule to Grow Them All: A General Theory of Neuronal Branching and Its Paractical Application' PLOS Computational Biology, 6 (8), Published Aug. 5, 2010.
Davison et al., PyNN: a common interface for neuronal network simulators, Frontiers in Neuroinformatics, Jan. 2009, pp. 1-10, vol. 2, Article 11.
Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.
Dorval et al. 'Probability distributions of the logarithm of inter-spike intervals yield accurate entropy estimates from small datasets.' Journal of neuroscience methods 173.1 (2008): 129.
Fidjeland et al., Accelerated Simulation of Spiking Neural Networks Using GPUs [online],2010 [retrieved on Jun. 15, 2013], Retrieved from the Internet: URL:http://ieeexplore.ieee.org/xpls/abs_all.jsp?ammber=5596678&tag=1.
Field, G.; Chichilnisky, E., Information Processing in the Primate Retina: Circuitry and Coding. *Annual Review of Neuroscience*, 2007, 30(1), 1-30.
Fiete, et al., Spike-Time-Dependent Plasticity and Heterosynaptic Competition Organize Networks to Produce Long Scale-Free Sequences of Neural Activity. *Neuron 65*, Feb. 25, 2010, pp. 563-576.
Floreano et al., 'Neuroevolution: from architectures to learning' Evol. Intel. Jan. 2008 1:47-62, [retrieved Dec. 30, 2013] [retrieved online from URL:<http://inforscience.epfl.ch/record/112676/files/FloreanoDuerrMattiussi2008.p df>.
Földiák, P., Learning invariance from transformation sequences. *Neural Computation*, 1991, 3(2), 194-200.
Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org>.
Gerstner et al. (1996) A neuronal learning rule for sub-millisecond temporal coding. *Nature* vol. 383 (6595) pp. 76-78.
Gewaltig et al., 'NEST (Neural Simulation Tool)'. Scholarpedia, 2007, pp. 1-15, 2(4): 1430, doi: 10.4249/scholarpedia.1430.
Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.
Gluck, Stimulus Generalization and Representation in Adaptive Network Models of Category Learning [online], 1991 [retrieved on Aug. 24, 2013]. Retrieved from the Internet<URL:http:// www.google.com/url?sa=t&rct=j&q=Giuck+%22STIMULUS+ GENERALIZATION+AND+REPRESENTATIO N+1 N + ADAPTIVE+NETWORK+MODELS+OF+CATEGORY+LEARN I NG%22+ 1991.
Gollisch et al. 'Rapid neural coding in the retina with relative spike latencies.' Science 319.5866 (2008): 1108-1111.
Goodman et al., Brian: a simulator for spiking neural networks in Python, Frontiers in Neuroinformatics, Nov. 2008, pp. 1-10, vol. 2, Article 5.
Gorchetchnikov et al., NineML: declarative, mathematically-explicit descriptions of spiking neuronal networks, Frontiers in Neuroinformatics, Conference Abstract: 4th INCF Congress of Neuroinformatics, doi: 10.3389/conf.fninf. 2011.08.00098.
Graham, Lyle J., The Surf-Hippo Reference Manual, http:// www.neurophys.biomedicale.univparis5. fr/-graham/surf-hippo-files/Surf-Hippo%20Reference%20Manual.pdf, Mar. 2002, pp. 1-128.
Hopfield JJ (1995) Pattern recognition computation using action potential timing for stimulus representation. *Nature* 376: 33-36.
Izhikevich E. M. and Hoppensteadt E.C. (2009) Polychronous Wavefront Computations. *International Journal of Bifurcation and Chaos*, 19:1733-1739.

Izhikevich E.M. (2004) Which Model to Use for Cortical Spiking Neurons? *IEEE Transactions on Neural Networks*, 15:1063-1070.
Izhikevich E.M. (2006) Polychronization: Computation With Spikes. *Neural Computation*,18:245-282.
Izhikevich et al., 'Relating STDP to BCM', Neural Computation (2003) 15, 1511-1523.
Izhikevich, E.M. (2007) Dynamical Systems in Neuroscience: The Geometry of Excitability and Bursting, *The MIT Press*, 2007.
Izhikevich, 'Simple Model of Spiking Neurons', IEEE Transactions on Neural Networks, vol. 14, No. 6, Nov. 2003, pp. 1569-1572.
Janowitz, M.K.; Van Rossum, M.C.W. Excitability changes that complement Hebbian learning. *Network, Computation in Neural Systems*, 2006, 17 (1), 31-41.
Karbowski et al., 'Multispikes and Synchronization in a Large Neural Network with Temporal Delays', Neural Computation 12, 1573-1606 (2000).
Khotanzad, Alireza, Classification of invariant image representations using a neural network, IEEE. Transactions on Acoustics, Speech, and Signal Processing vol. 38 No. 6 Jun. 1990 pp. 1028-1038.
Khotanzad, 'Classification of invariant image representations using a neural network' IEEF . Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf.
Knoblauch, et al. Memory Capacities for Synaptic and Structural Plasticity, *Neural Computation* 2009, pp. 1-45.
Laurent, 'Issue 1—nnql—Refactor Nucleus into its own file—Neural Network Query Language' [retrieved on Nov. 12, 2013]. Retrieved from the Internet: URL:https:// code.google.com/p/nnql/issues/detail?id=1.
Laurent, 'The Neural Network Query Language (NNQL) Reference' [retrieved on Nov. 12, 2013]. Retrieved from the Internet: <URL'https://code.google.com/p/nnql/issues/detail?id=1>.
Lazar et al. 'A video time encoding machine', in Proceedings of the 15th IEEE International Conference on Image Processing (ICIP '08), 2008, pp. 717-720.
Lazar et al.,'Consistent recovery of sensory stimuli encoded with MIMO neural circuits.' Computational intelligence and neuroscience (2010): 2.
Lazar et al. 'Multichannel time encoding with integrate-and-fire neurons.' Neurocomputing 65 (2005): 401-407.
Masquelier and Thorpe, Learning to recognize objects using waves of spikes and Spike Timing-Dependent Plasticity. *Neural Networks (IJCNN)*, The 2010 International Joint Conference on DOI—10. 1109/IJCNN.2010.5596934 (2010) pp. 1-8.
Masquelier, Timothee. 'Relative spike time coding and STOP-based orientation selectivity in the early visual system in natural continuous and saccadic vision: a computational model.' Journal of computational neuroscience 32.3 (2012): 425-441.
Meister, M., Multineuronal codes in retinal signaling. *Proceedings of the National Academy of sciences*. 1996, 93, 609-614.
Meister, M.; Berry, M.J. The neural code of the retina, *Neuron*. 1999, 22, 435-450.
Nichols, A Re configurable Computing Architecture for Implementing Artificial Neural Networks on FPGA, Master's Thesis, The University of Guelph, 2003, pp. 1-235.
Oster M., Lichtsteiner P., Delbruck T, Liu S. A Spike-Based Saccadic Recognition System. *ISCAS 2007. IEEE International Symposium on Circuits and Systems*, 2009, pp. 3083-3086.
Paugam-Moisy et al. 'Computing with spiking neuron networks.' Handbook of Natural Computing, 40 p. Springer, Heidelberg (2009).
Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].
Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu/viewdoc/download?doi=10.1.1.5.4346&rep=rep1&type=pdf.

(56) References Cited

OTHER PUBLICATIONS

Rekeczky, et al., "Cellular Multiadaptive Analogic Architecture: A Computational Framework for UAV Applications." May 2004.
Revow M., Williams C., and Hinton, G.E., 1996, Using Generative Models for Handwritten Digit Recognition, *IEEE Trans. on Pattern Analysis and Machine Intelligence*, 18, No. 6, Jun. 1996.
Sanchez, Efficient Simulation Scheme for Spiking Neural Networks, *Doctoral Thesis, Universita di Granada* Mar. 28, 2008, pp. 1-104.
Sato et al., 'Pulse interval and width modulation for video transmission,' Cable Television, IEEE Transactions on 4 (1978): 165-173.
Schemmel, J., et al. Implementing synaptic plasticity in a VLSI spiking neural network model, Proceedings of the 2006 International Joint Conference on Neural Networks, Jul. 2006 pp. 1-6.
Schnitzer, M.J.; Meister, M.; Multineuronal Firing Patterns in the Signal from Eye to Brain. *Neuron*, 2003, 37, 499-511.
Serrano-Gotarredona, et al, "On Real-Time: AER 2-D Convolutions Hardware for Neuromorphic Spike-based Cortical Processing", Jul. 2008.
Simulink.RTM. model [online], [Retrieved on Dec. 10, 2013] Retrieved from <URL: http://www.mathworks.com/ products/ simulink/index.html>.
Sinyavskiy et al. 'Reinforcement learning of a spiking neural network in the task of control of an agent in a virtual discrete environment' Rus. J. Nonlin. Dyn., 2011, vol. 7, No. 4 (Mobile Robots), pp. 859-875, chapters 1-8 (Russian Article with English Abstract).
Sjostrom et al., 'Spike-Timing Dependent Plasticity' Scholarpedia, 5(2):1362 (2010), pp. 1-18.
Szatmary et al., 'Spike-timing Theory of Working Memory' PLoS Computational Biology, vol. 6, Issue 8, Aug. 19, 2010 [retrieved on Dec. 30, 2013]. Retrieved from the Internet: URL: http://www.ploscompbiol.org/article/info%3Adoi% 2F10.1371 %2Fjournal.pcbi.10008 79#>.
Thomas S. and Riesenhuber, M, 2004, Realistic Modeling of Simple and Complex Cell Tuning in the HMAX Model, and Implications for Invariant Object Recognition in Cortex, *AI Memo* 2004-017 Jul. 2004.
Thorpe, S.J., Delorme, A. & Vanrullen, R. (2001). Spike-based strategies for rapid processing. *Neural Networks* 14, pp. 715-725.
Thorpe, S.J., Guyonneau, R., Guilbaud, N., Allegraud, J-M. & Vanrullen, R. (2004). SpikeNet: real-time visual processing with one spike per neuron. *Neurocomputing*, 58-60, pp. 857-864.
Tim Gollisch and Markus Meister (2008) Rapid Neural Coding in the Retina with Relative Spike Latencies. *Science* 319:1108-1111.
Van Rullen R.; Thorpe, S. Rate Coding versus temporal order coding: What the Retinal ganglion cells tell the visual cortex. *Neural computation*, 2001, 13, 1255-1283.
Vanrullen, R. & Koch, C. (2003). Is perception discrete or continuous? *Trends in Cognitive Sciences* 7(5), pp. 207-213.
Vanrullen, R., Guyonneau, R. & Thorpe, S.J. (2005). Spike times make sense. *Trends in Neurosciences* 28(1).
Wallis, G.; Rolls, E. T. A model of invariant object recognition in the visual system. *Progress in Neurobiology*. 1997, 51, 167-194.
Wang, 'The time dimension for scene analysis.' Neural Networks, IEEE Transactions on 16.6 (2005): 1401-1426.
Wiskott, L.; Sejnowski, T.J. Slow feature analysis: Unsupervised learning of invariances. *Neural Computation*, 2002, 14, (4), 715-770.
Zarandy, et al., "Bi-i: A Standalone Ultra High Speed Cellular Vision System", Jun. 2005.
Stringer, et al., "Invariant Object Recognition in the Visual System with Novel Views of 3D Objects", 2002, 2585-2596, 12 pages.
Wiskott, et al., "Slow Feature Analysis", 2002, 29 pages.
Ramachandran, et al., "The Perception of Phantom Limbs", The D.O. Hebb Lecture, Center for Brain and Cognition, University of California, 1998, 121, 1603-1630, 28 pages.
Brette, et al., "Simulation of Networks of Spiking Neurons: A Review of Tools and Strategies", Received Nov. 29, 2006, Revised Apr. 2, 2007, Accepted Apr. 12, 2007, Springer Science, 50 pages.
Izhikevich E.M., "Neural Excitability, Spiking and Bursting", Neurosciences Institute, Received Jun. 9, 1999, Revised Oct. 25, 1999, 1171-1266, 96 pages.
Kazantsev, et al., "Active Spike Transmission in the Neuron Model With a Winding Threshold Maniford", Jan. 3, 2012, 205-211, 7 pages.
Kling-Petersen, PhD, "Sun and HPC: From Systems to PetaScale" Sun Microsystems, no date, 31 pages.
Martinez-Perez, et al., "Automatic Activity Estimation Based on Object Behavior Signature", 2010, 10 pages.
Matsugu, et al., "Convolutional Spiking Neural Network for Robust Object Detection with Population Code Using Structured Pulse Packets", 2004, 39-55, 17 pages.
Swiercz, Waldemar, et al., "A new synaptic plasticity rule for networks of spiking neurons." Neural Networks, IEEE Transactions on 17.1 (2006): 94-105.
Li, Zhaoping. "A saliency map in primary visual cortex." Trends in cognitive sciences 6.1 (2002): 9-16.
Itti, Laurent, and Christof Koch. "Computational modelling of visual attention." Nature reviews neuroscience 2.3 (2001): 194-203.
Izhikevich, Eugene M. Dynamical systems in neuroscience: chapters 1 and 2. MIT press, 2007.
Wu, QingXiang, et al. "Remembering Key Features of Visual Images based on Spike Timing Dependent Plasticity of Spiking Neurons." Image and Signal Processing, 2009. CISP'09. 2nd International Congress on. IEEE, 2009.
Izhikevich, Eugene M. "Simple model of spiking neurons." IEEE Transactions on neural networks 14.6 (2003): 1569-1572.
Fiete, Illa R, et al. "Spike-time-dependent plasticity and heterosynaptic competition organize networks to produce long scale-free sequences of neural activity." Neuron 65.4 (2010): 563-576.
Chistiakova, Marina, and Maxim Volgushev. "Heterosynaptic plasticity in the neocortex." Experimental brain research 199.3-4(2009) 377-390.
Knoblauch, Andreas, Gunther Palm, and Friedrich T. Sommer. "Memory capacities for synaptic and structural plasticity." Neural Computation 22.2 (2010): 289-341.
Meinhardt, Hans, and Alfred Gierer. "Pattern formation by local self-activation and lateral inhibition." Bioessays 22.8 (2000): 753-760.
Markram, Henry, et al. "Regulation of synaptic efficacy by coincidence of postsynaptic Aps and EPSPs" Science 275.5297 (1997): 213-215.

\* cited by examiner

United States Patent No. US 9,111,226 B2

MODULATED PLASTICITY APPARATUS AND METHODS FOR SPIKING NEURON NETWORK

CROSS-REFERENCE TO RELATED APPLICATIONS

This application is related to co-owned U.S. patent application Ser. No. 13/152,119, entitled "SENSORY INPUT PROCESSING APPARATUS AND METHODS", filed on Jun. 2, 2011, co-owned and co-pending U.S. patent application Ser. No. 13/465,924, entitled "SPIKING NEURAL NETWORK FEEDBACK APPARATUS AND METHODS", filed May 7, 2012, co-owned and co-pending U.S. patent application Ser. No. 13/465,903 entitled "SENSORY INPUT PROCESSING APPARATUS IN A SPIKING NEURAL NETWORK", filed May 7, 2012, a co-owned U.S. patent application Ser. No. 13/465,918, entitled "SPIKING NEURAL NETWORK OBJECT RECOGNITION APPARATUS AND METHODS", filed May 7, 2012, a co-owned U.S. patent application Ser. No. 13/488,106, entitled "SPIKING NEURON NETWORK APPARATUS AND METHODS", filed Jun. 4, 2012, a co-owned U.S. patent application Ser. No. 13/488,144, entitled "SPIKING NEURON NETWORK APPARATUS AND METHODS", filed Jun. 4, 2012, a co-owned U.S. patent application Ser. No. 13/541,531, entitled "CONDITIONAL PLASTICITY SPIKING NEURON NETWORK APPARATUS AND METHODS", filed Jul. 3, 2012, co-owned U.S. patent application Ser. No. 13/660,923, entitled "ADAPTIVE PLASTICITY APPARATUS AND METHODS FOR SPIKING NEURON NETWORK", filed herewith on Oct. 25, 2012, and co-owned U.S. patent application Ser. No. 13/660,967, entitled "APPARATUS AND METHODS FOR ACTIVITY-BASED PLASTICITY IN A SPIKING NEURON NETWORK", filed herewith on Oct. 25, 2012, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to artificial neural networks, and more particularly in one exemplary aspect to computer apparatus and methods for plasticity implementation in a pulse-code neural network.

2. Description of Related Art

Artificial spiking neural networks are frequently used to gain an understanding of biological neural networks, and for solving artificial intelligence problems. These networks typically employ a pulse-coded mechanism, which encodes information using timing of the pulses. Such pulses (also referred to as "spikes" or 'impulses') are short-lasting (typically on the order of 1-2 ins) discrete temporal events. Several exemplary embodiments of such encoding are described in commonly owned and co-pending U.S. patent application Ser. No. 13/152,084 entitled APPARATUS AND METHODS FOR PULSE-CODE INVARIANT OBJECT RECOGNITION", filed Jun. 2, 2011, and U.S. patent application Ser. No. 13/152,119, Jun. 2, 2011, entitled "SENSORY INPUT PROCESSING APPARATUS AND METHODS", each incorporated herein by reference in its entirety.

Typically, artificial spiking neural networks, such as the exemplary network described in owned U.S. patent application Ser. No. 13/541,531, entitled "CONDITIONAL PLASTICITY SPIKING NEURON NETWORK APPARATUS AND METHODS", may comprise a plurality of units (or nodes), which correspond to neurons in a biological neural network. Any given unit may be connected to many other units via connections, also referred to as communications channels, and/or synaptic connections. The units providing inputs to any given unit are commonly referred to as the pre-synaptic units, while the unit receiving the inputs is referred to as the post-synaptic unit.

Each of the unit-to-unit connections may be assigned, inter alia, a connection efficacy, which in general may refer to a magnitude and/or probability of input spike influence on unit output response (i.e., output spike generation/firing). The efficacy may comprise, for example a parameter—synaptic weight—by which one or more state variables of post-synaptic unit are changed. During operation of a pulse-code network, synaptic weights may be dynamically adjusted using what is referred to as the spike-timing dependent plasticity (STDP) in order to implement, among other things, network learning. In some implementations, larger weights may be associated with a greater effect a synapse has on the activity of the post-synaptic neuron.

In some existing plasticity implementations, connections that deliver inputs (to a given unit) prior to generation of post-synaptic response may be potentiated, while connections that deliver inputs after the generation of the post-synaptic response may be depressed. The choice of plasticity functional dependence may determine network behavior. Accordingly, various implementations plasticity mechanisms exist including, for example, the use of target connection efficiency (that may be defined as a ratio of a number of input (pre-synaptic) spikes $N_{fire}$ delivered to a neuron via the connection that are followed by neuron response (e.g., post-synaptic spike) generation, to the total number of input spikes $N_{tot}$ delivered to the neuron via the connection, described in U.S. patent application Ser. No. 13/541,531, entitled "CONDITIONAL PLASTICITY SPIKING NEURON NETWORK APPARATUS AND METHODS. In other implementations, described for example in U.S. patent application Ser. No. 13/488,106, entitled "SPIKING NEURON NETWORK APPARATUS AND METHODS", activity of neighboring neurons may be used to in deriving plasticity mechanism (e.g., depress connections of the neuron). However, existing plasticity implementations do not always provide for network behavior, particularly when input characteristics change.

Consequently, there is a salient need for improved adaptive plasticity mechanisms to produce a spiking neuron network capable of operating in a wide variety of input and network dynamic regimes.

SUMMARY OF THE DISCLOSURE

The present disclosure satisfies the foregoing needs by providing, inter alia, apparatus and methods for implementing plasticity in spiking neuron networks that can, inter alia, operate in a wide variety of input and network dynamic regimes.

Firstly, a method of object recognition by a computerized spiking neuron network is disclosed. In one implementation, the network includes first and second spiking neurons, and the method includes, for a signal a signal comprising first and second representations of first and second objects, respectively: based on a first response by the first neuron to the representation of at least one of the first and the second objects: potentiating a first feed-forward connection delivering the signal to the first neuron; and incrementing an inhibition indication for the second neuron. In one variant, the method further includes, based on a second response by the second neuron to the representation of at least one of the first and the second objects: depressing a second feed-forward connection delivering the signal to the second neuron; and incrementing an inhibition indication for the first neuron.

A computerized spiking neuron apparatus is also disclosed herein. In one implementation, the apparatus includes a storage medium, the storage medium having a plurality of executable instructions being configured to, when executed, adjust efficacy of an interface of a neuron by at least: determination of a pre-synaptic plasticity rule for the interface based on at least: a parameter associated with a post-synaptic plasticity rule for the interface; an inhibitory efficacy associated with an output activity of another neuron; and the efficacy of the interface. In one variant, the instructions are further configured to, based on at least an output generated by the neuron responsive to a feed-forward stimulus, adjust the efficacy of the interface based on at least one of the post-synaptic rule and the pre-synaptic rule.

A computerized spiking neuron network sensory signal processing system is further disclosed. In one implementation, the system includes one or more processors configured to execute computer program modules, the execution of the computer program modules configured to cause the one or more processors, based on a response by a neuron of the network, to adjust one or more connections capable of providing input to the neuron by at least: incrementing an inhibitory trace based on at least a similarity measure between output of the neuron comprising the response, and output of another neuron; and depressing at least one of the one or more connections based on at least a non-zero similarity measure and a positive increment of the inhibitory trace.

In yet a further aspect, a neural network is disclosed. In one embodiment, the neural network is implemented using adaptive plasticity that operates using inhibitory connection efficacy that may delay (and/or prevent altogether) a neuron neighboring a first neuron from generating a post-synaptic output in response to a same feed forward input applied to the first neuron. The neighboring neuron may subsequently begin responding to feed-forward inputs that may contain representations of other objects and/or features, thereby advantageously enhancing learning by the network as a whole.

Further features of the present disclosure, its nature and various advantages will be more apparent from the accompanying drawings and the following detailed description.

Figure 1A:
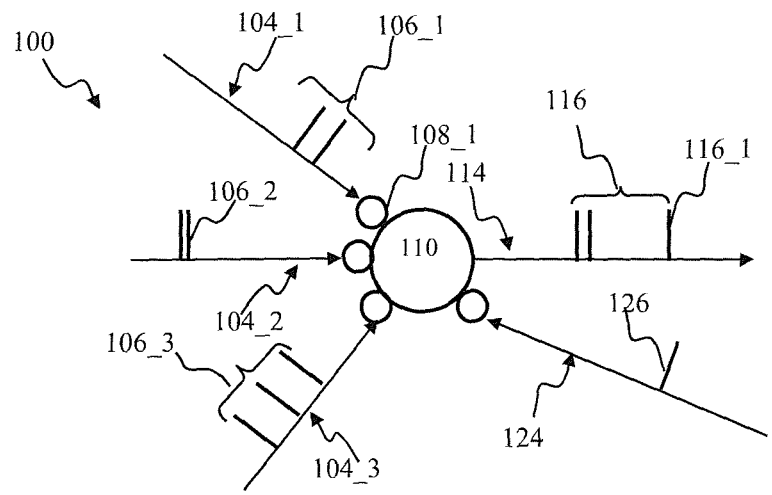
FIG. 1A is a block diagram depicting an artificial spiking neural network according to one implementation.

All Figures disclosed herein are © Copyright 2012 Brain Corporation. All rights reserved.

DETAILED DESCRIPTION

Embodiments and implementations of the various aspects of the present innovation will now be described in detail with reference to the drawings, which are provided as illustrative examples so as to enable those skilled in the art to practice the disclosure. Notably, the figures and examples below are not meant to limit the scope of the present disclosure to a single embodiment or implementation, but other embodiments and implementations are possible by way of interchange of or combination with some or all of the described or illustrated elements. Wherever convenient, the same reference numbers will be used throughout the drawings to refer to same or like parts.

Where certain elements of these embodiments or implementations can be partially or fully implemented using known components, only those portions of such known components that are necessary for an understanding of the present disclosure will be described, and detailed descriptions of other portions of such known components will be omitted so as not to obscure the innovation.

In the present specification, an embodiment or implementations showing a singular component should not be considered limiting; rather, the invention is intended to encompass other embodiments or implementations including a plurality of the same component, and vice-versa, unless explicitly stated otherwise herein.

Further, the present invention encompasses present and future known equivalents to the components referred to herein by way of illustration.

As used herein, the term "bus" is meant generally to denote all types of interconnection or communication architecture that is used to access the synaptic and neuron memory. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in pulse-based system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the terms "connection", "link", "synaptic channel", "transmission channel", "delay line", are meant generally to denote a causal link between any two or more entities (whether physical or logical/virtual), which enables information exchange between the entities.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "processor", "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.) or IrDA families.

As used herein, the terms "pulse", "spike", "burst of spikes", and "pulse train" are meant generally to refer to, without limitation, any type of a pulsed signal, e.g., a rapid change in some characteristic of a signal, e.g., amplitude, intensity, phase or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software message representing a discrete pulsed event, and any other pulse or pulse type associated with a discrete information transmission system or mechanism.

As used herein, the term "receptive field" is used to describe sets of weighted inputs from filtered input elements, where the weights may be adjusted.

As used herein, the term "Wi-Fi" refers to, without limitation, any of the variants of IEEE-Std. 802.11 or related standards including 802.11 a/b/g/n/s/v and 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, RFID or NFC (e.g., EPC Global Gen. 2, ISO 14443, ISO 18000-3), satellite systems, millimeter wave or microwave systems, acoustic, and infrared (e.g., IrDA).

Overview

The present disclosure provides, in one salient aspect, apparatus and methods for implementing adaptive plasticity mechanisms configured to, inter alia, to improve learning (e.g., faster learning and/or learn more useful features) in artificial spiking neuron networks.

The adaptive plasticity mechanism may be based on a measure of similarity between outputs of two or more neurons receiving feed-forward input comprising representation of a feature. In some implementations, an a-priori similarity measure may be utilized. The measure may be for example adaptively determined on-line based on a cross-correlogram, cross-correlation, convolution, deconvolution, and/or mutual information between outputs of two or more post-synaptic neurons.

In an exemplary embodiment, when a post-synaptic neuron generates an output (fires a spike at time t0) based on the feed-forward input, the cross-correlogram may be determined based on occurrence of one or more post-synaptic spikes in output activity history associated with one or more other neurons receiving the same (or similar) feed-forward input. Whenever one or more post-synaptic spikes occur within an output history of a neighboring neuron, the efficacy of inhibitory connection to that neuron trace may be incremented in accordance with (i) the time interval Δt between the time t0 and the spike history time; and (ii) the magnitude of the similarity curve corresponding to the interval Δt.

Greater inhibitory connection efficacy may delay (and/or prevent altogether) the neighboring neuron from generating a post-synaptic output in response to the same feed forward input. The neighboring neuron may subsequently begin responding to feed-forward inputs that may contain representations of other objects and/or features.

The exemplary plasticity methodology describe herein may advantageously improve learning of the neural network. The improved learning may be characterized by e.g., emergence of different receptive fields, requiring fewer neurons to represent a given input, and ability of the network to recognize a richer feature set.

In another aspect of the disclosure, adaptive adjustment methodologies are used to implement processing of visual sensory information and feature/object recognition using spiking neuronal networks. Portions of the object recognition apparatus can be embodied for example in a remote computerized apparatus (e.g., server), comprising a computer readable apparatus.

Embodiments of the foregoing functionality of the present disclosure are useful in a variety of applications including for instance a prosthetic device, autonomous robotic apparatus, and other electromechanical devices requiring visual or other sensory data processing functionality.

Methods

Detailed descriptions of the various embodiments and implementations of the apparatus and methods of the disclosure are now provided. Although certain aspects of the disclosure can best be understood in the context of the visual and sensory information processing using spiking neural networks, the disclosure is not so limited, and implementations of the disclosure may also be used in a wide variety of other applications, including for instance in implementing connection adaptation in pulse-code neural networks.

Implementations of the disclosure may be for example deployed in a hardware and/or software realization of a neuromorphic computer system. In one such implementation, a robotic system may include a processor embodied in an application specific integrated circuit, which can be adapted or configured for use in an embedded application (such as a prosthetic device).

FIG. 1A illustrates one exemplary implementation of a spiking neuronal network of the disclosure, configured to process sensory information using adaptive plasticity mechanism. The network 100 may comprise one or more spiking neurons, e.g., the neuron 110 in FIG. 1A. The neuron 110 may be configured to receive feed-forward spiking input via connections 104. In some implementations, the neuron 110 may be configured to receive feedback spiking input via the connections 124. The neuron 110 may generate output (e.g., a post-synaptic spike) using any of applicable methodologies such as for example those described in co-owned and co-pending U.S. patent application Ser. No. 13/152,105 filed on Jun. 2, 2011, and entitled "APPARATUS AND METHODS FOR TEMPORALLY PROXIMATE OBJECT RECOGNITION", incorporated by reference herein in its entirety. The output spikes of the neuron 110 may be propagated via the connection 114. Post-synaptic spike generation is well-established in the spiking network arts, and accordingly will not be described in detail herein for brevity and clarity of presentation of the inventive aspects of the present disclosure.

The connections 104_1, 104_2, 104_3, 124 may be characterized by connection efficacy. Efficacy may refer to a magnitude and/or probability of input spike influence on neuronal response (i.e., output spike generation or firing). Efficacy may comprise, for example a parameter 108 (e.g., synaptic weight, delay, probability of transmission, and/or other parameter) by which one or more state variables of the neuron 110 may be changed.

Connection efficacy may be changed in accordance with one or more STDP rules. In some implementations, individual connections may utilize connection-specific rules. In one or more implementations, different classes of connections (e.g., fee-forward, lateral, and/or feedback) may utilize type-specific common STDP rules.

In some implementations, the STDP rule may comprise an adaptive STDP mechanism that may be determined in real time by a network entity (e.g., the neuron 110, and/or another entity (connection).

In one or more implementations, the adaptive plasticity mechanism may be based on a similarity measure (e.g., a cross-correlogram and/or mutual information) between neuron output (e.g., the output 116) and the neuron input (e.g., the input 106_1, 106_2, 106_3, 126 in FIG. 1).

Figure 1B:
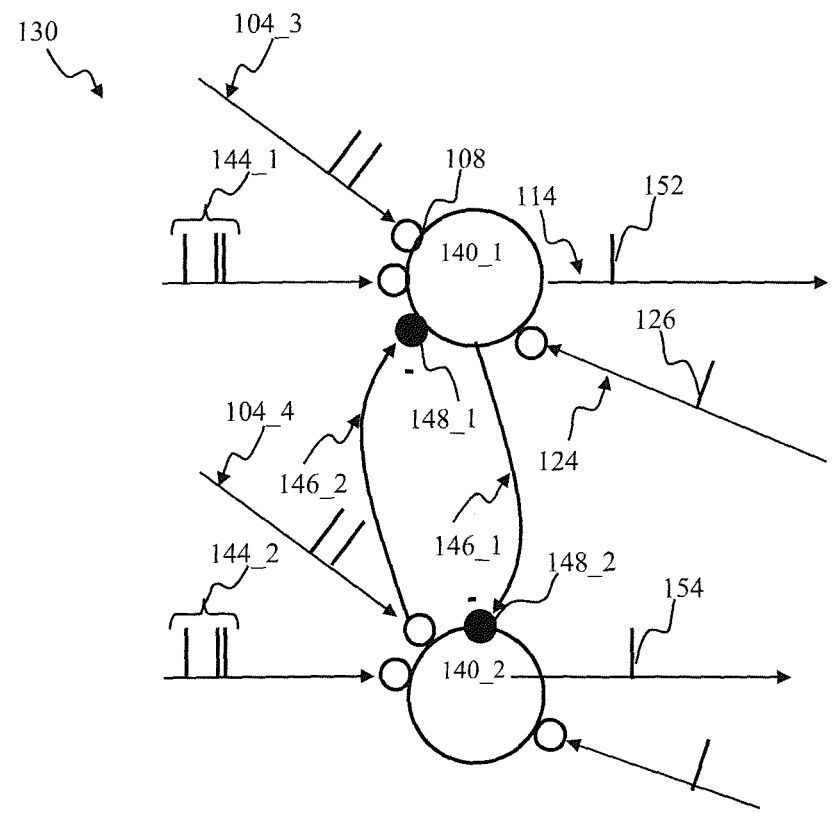
FIG. 1B is a block diagram depicting an artificial spiking neural network comprising inhibitory connections according to one implementation.
Figure 2A:
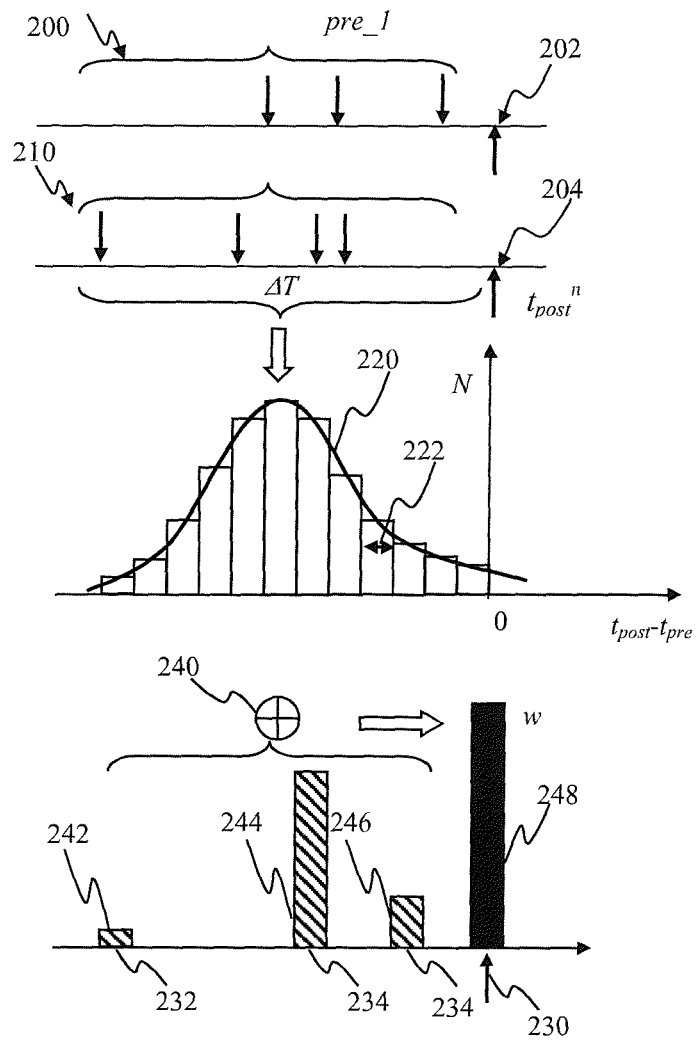
FIG. 2A is a graphical illustration depicting histogram determination based on post-synaptic and pre-synaptic activity of a unit of the spiking network of FIG. 1A, according to one implementation.

FIG. 2A illustrates one implementation of such an adaptive mechanism. When the neuron generates an output (fires a spike 116_1, and/or spike 202 in FIG. 2A) at time $t_{post}$, the cross-correlogram may be determined based on (i) a time record of pre-synaptic input (e.g., the input 106_1, 106_2, 106_3, 126 in FIG. 1A, and/or input 200, 210 in FIG. 2A) into the neuron with a time interval $t_{post}-\Delta T$; and (ii) a time record of post-synaptic output (e.g., the output 116 in FIG. 1) by the neuron with the same time interval. The time interval ΔT may be selected form the range between 1 and 100 ms, preferably 40 ms. In some implementations, multiple correlogram estimates (associates with multiple post-synaptic responses 202, 204) may be averaged to produce a time-averaged similarity measure 220. In some implementations, the average histogram 220 maybe computed by averaging over the last 1000 spikes across all input synapses or may be computed by averaging over the last 100 second time period.

In some implementations where the neuron receives multiple pre-synaptic connections (physical and/or logical, as illustrated in FIG. 1A), individual correlograms may be constructed for individual connections (e.g., the connections 104 in FIG. 1A). An averaged (over multiple connections) correlogram may be determined (not shown in FIG. 2A).

In some implementations, individual spikes (e.g., the spike groups 200, 210 in FIG. 2A) may be assigned the same amplitude (e.g., binary 1). Accordingly, the binary correlogram 220 may be interpreted as a histogram of pre-synaptic spike occurrence within individual time slots (bins) prior to the post-synaptic response. In some implementations, the time step (bin width) 222 may be selected equal to 1 ms.

Figure 3A:
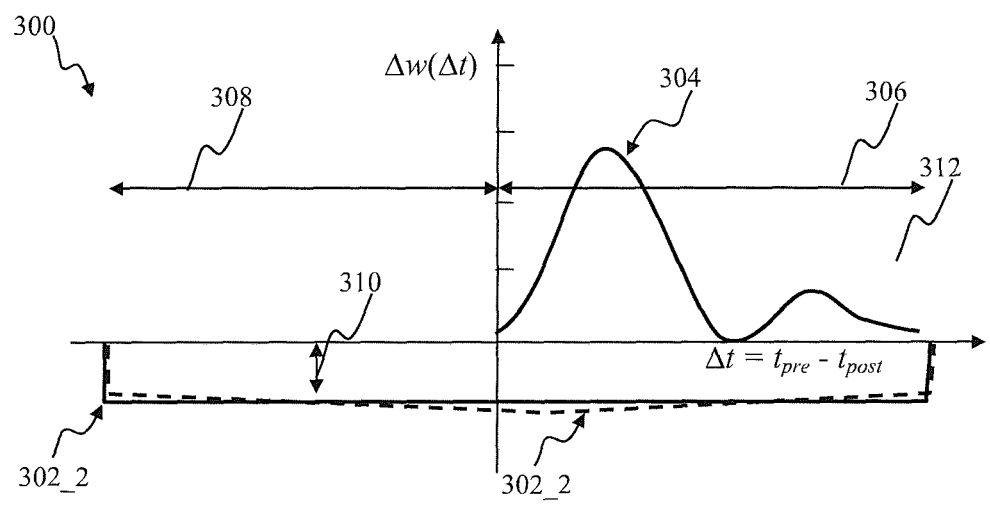
FIG. 3A is a plot depicting adaptively constructed spike-time dependent plasticity (STDP) for use in the spiking network of FIG. 1A, according to one implementation.

Averaged similarity measure (e.g., the correlogram 220) may be used to construct plasticity rules for the connections of the neuron, as described in detail with respect to FIG. 3A.

The STDP rule 300 of FIG. 3A, may comprise a long term depression rule 302 and/or a long term potentiation rule 304. For example, the pre-synaptic portion (i.e., where $t_{pre}<t_{post}$) may comprise the LTD rule, and the post-synaptic portion (i.e., where $t_{pre}\geq t_{post}$) may comprise the LTP rule, as shown in the exemplary implementation of FIG. 3A The causal portion of the similarity measure (e.g., the portion of the curve 220 of FIG. 2A where $t_{post}-t_{pre}<0$, also corresponding to the portion of the correlogram where pre-synaptic spikes came before post-synaptic spikes) may be used to construct the LTP rule. In some implementations, the LTP rule may be characterized by a plasticity window Tp 306 in FIG. 3A. Correspondingly, values of the similarity measure (220 in FIG. 2A) that fall within the time interval 306 may be used to determine the LTP portion of the plasticity rule. In some implementations the similarity measure and w(Δt) of plasticity adjustments may be scaled such that the mean value is constrained to be 1, or the maximum value may be constrained to be 1. The LTD portion of the STDP rule may comprise for example a monotonic function of time (e.g., a constant 302_1, gradually increasing and/or decreasing 302_2). The magnitude of the LTD portion may be determined based on a statistical parameter of the LTP portion. The statistical parameter may comprise for instance mean, median, a percentile, maximum, etc.

The LTD portion may be characterized by a time window Td 308. In some implementations, the LTP and LTD windows 306, 308 may be configured equal to one another. In one or more implementations, the LTP and LTD windows 306, 308 may be configured between 1 and 1000 ms. It will be appreciated by those skilled in the arts, that the interval ΔT may be adjusted in accordance with the temporal characteristics of the input. In some implementations adapted to process, for example, high-speed imagery, the plasticity interval may be shortened. In implementations adapted to process, for example, medical ultrasonograms and/or seismic imagery, the plasticity interval may be increased.

In one or more implementations, the time window ΔT used for determining similarity measure (e.g., the measure 220 in FIG. 2A) may be set equal to either Tp, Td. The time windows ΔT, Tp, Td may also be configured different from one another such that the window of LTD is longer than LTP (or vice versa) depending on the temporal structure of the pattern to be learned.

The adaptively configured STDP rules (e.g., the rules 304, 302 in FIG. 3A) may be used to adjust efficacy of neuron connections. In some implementations, the adjustment may be performed based on the post-synaptic response of the neuron. In one or more implementations, the efficacy may comprise synaptic weight.

Returning now to FIG. 2A, when the neuron generates post-synaptic response (230 in FIG. 2A), the history of pre-synaptic input may be evaluated. One or more pre-synaptic pulses (the spikes 232, 234, 236 in FIG. 2A) may be identified within the time window ΔT, prior to the post-synaptic spike 230. Plasticity components (e.g., the components 242, 244, 246), corresponding to the pre-synaptic times $t_{pre}^{i}$ of the identified pulses 232, 234, 236, may be combined by an operator 240 to produce weight adjustment w 248. In some implementations, the adjustment may be performed based on an event, such as timer expiration, buffer overflow, external (reward) indication, and/or other event types).

FIG. 1B illustrates one exemplary implementation of a spiking neuronal network according to the disclosure, comprising an inhibitory plasticity mechanism. The network 130 may comprise one or more spiking neurons (e.g., the neuron 140 in FIG. 1A). The neurons 140_1, 140_2 may be configured to receive feed-forward spiking input via connections 104. In some implementations, the neuron 110 may be configured to receive feedback signal 126 via the feedback connections 124. The neurons 140 may generate output (e.g., a post-synaptic spikes 152, 154 in FIG. 1B) using any of applicable methodologies, such as for example those described in co-owned and co-pending U.S. patent application Ser. No. 13/152,105 filed on Jun. 2, 2011, and entitled "APPARATUS AND METHODS FOR TEMPORALLY PROXIMATE OBJECT RECOGNITION", incorporated by reference herein in its entirety. The output spikes of the neuron 140 may be propagated via the connections 114. Post-synaptic spike generation is well-established in the spiking network arts, and accordingly will not be described in detail herein for brevity and clarity of presentation of the inventive aspects of the present disclosure.

The network 130 may comprise one or more inhibitory connections 146 characterized by a connection efficacy. The efficacy of the inhibitory connections 146 may comprise, for example, a parameter 148 (e.g., synaptic weight, delay, probability of transmission, and/or other parameter) by which one or more state variables of the neuron 140 may be changed. In one or more implementations, the inhibitory connection may cause a delay (and or suppression) of a post-synaptic response by the neuron 140.

The efficacy 148 of the connections 146 may be changed for instance in accordance with the methodologies described in detail with respect to FIGS. 2B, 3B-3C, below.

When a post-synaptic neuron (e.g., the neuron 140_1 in FIG. 1B) generates an output (fires a spike 260 in FIG. 2B at time t0) based on the feed-forward input (e.g., the input 144_1 in FIG. 1B), activity of one or more neighboring neurons (e.g., the neuron 140_2 in FIG. 1B) that may be receiving the same feed-forward input (e.g., the input 144_2 in FIG. 1B) may be examined.

Figure 2B:
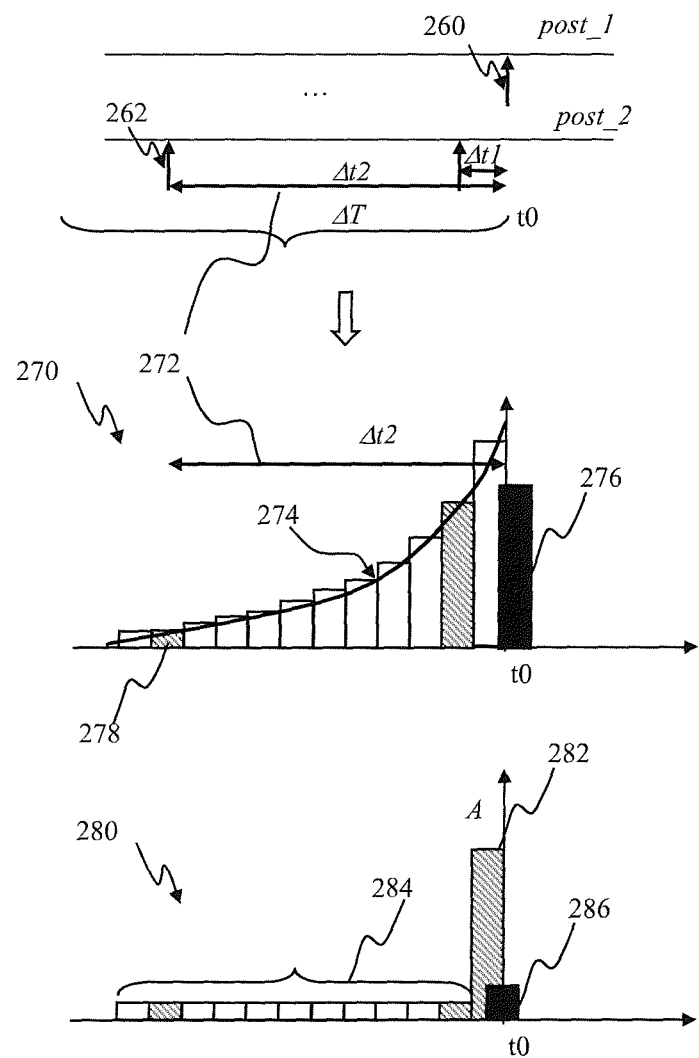
FIG. 2B is a graphical illustration depicting inhibitory trace determination based on a similarity measure between activity of two units, according to one implementation.

Exemplary implementations of neighbor activity evaluation according to the disclosure is illustrated by the panels 270, 280 of FIG. 2B. The first panel 270 illustrates one implementation of neighbor activity evaluation based on a dynamically determined similarity measure. The similarity measure may comprise for instance a cross correlogram, depicted by the curve 274 in FIG. 2B. The correlogram may be determines based on a correlation between (i) one or more post-synaptic spikes of one neuron (e.g., the spike 260 of the post_1 neuron trace in FIG. 2B) with (ii) one or more post-synaptic spikes of another neuron (e.g., the spike 262 of the post_2 neuron trace in FIG. 2B). The similarity measure may be averaged over a time period ZIT prior to the generation of the spike 260, as shown in FIG. 2B. In some implementations, the time interval ΔT may be selected to cover a time interval comprising between 1 and 1000 post-synaptic spikes. Based on a spike rate the time interval ΔT may be selected between 1 and 1000 s.

In one or more implementations, the similarity measure may comprise a discrete distribution of one or more bins (e.g., bins 278, 282, 284 in FIG. 2B). The width of the bins 278 may be configured to be equal to the network uprate time step (e.g., 1 ms in some implementations).

In one or more implementations, a pre-determined functional dependence of the similarity measure, as illustrated by the exemplary histogram in the panel 280 in FIG. 2B, may be utilized. The pre-determined similarity measure includes in one implementation a strongly potentiating portion (e.g., the bin 282 in FIG. 2B) and a tail portion (e.g., the bins 284 in FIG. 2B). The tail portion may be configured to have lower magnitude, compared to the strongly potentiating portion (0.05-0.2). The time extent of the tail portion may be configured to cover the activity of neighboring neurons prior to the time t0.

As illustrated in FIG. 2B, for the post-synaptic spike 260, the neighbor activity trace (post_2) comprises two spikes occurring at time intervals Δt1, Δt2 prior to the spike 260. Efficacy G of inhibitory connection from post_1 to post_2 (e.g., the connection 146-1 in FIG. 1B, may be adjusted in accordance with the magnitude of the similarity measure (e.g., the measures 274, 280 in FIG. 2B), as follows:

$$G = G(C(Y_1, Y_2))$$ (Eqn. 1)

where $Y_1$, $Y_2$ are post-synaptic activity of two neighboring neurons. In one or more implementations, the efficacy G of the inhibitory connection may be updated due the one or more neighbor activity spikes (e.g., the spike 262 at time interval 272) as follows:

$$\Delta G = \Sigma_i^N C_i \delta(t_i - t_i^{post2}) \quad \text{(Eqn. 2)}$$

where:
$C_1$ are the magnitude of the similarity measure bins (e.g., the bins 278, 282, 284 in FIG. 2B); and
$t_i^{post2}$ is the post-synaptic spike train (e.g., the spikes 262 in FIG. 2B) of the neighboring neuron.

In one or more implementations, the width of the similarity measure time window (e.g., the temporal extent of the rule 280 (i.e., the portions 282, 284), and/or the interval 272 of the rule 270) may be selected form the range between 1 and 100 ms.

The exemplary inhibitory efficacy adjustment obtained in accordance with Eqn. 2 is shown by the solid rectangles 276, 286 in FIG. 2B. The inhibitory efficacy G may be configured to decrease with time. In one or more implementations, the decrease may comprise an exponential decay configured as follows:

$$G(t) = \Delta G e^{-t/\tau} \quad \text{(Eqn. 3)}$$

where the decay time scale $\tau$ may be selected between 5 and 30 ms.

Figure 2C:
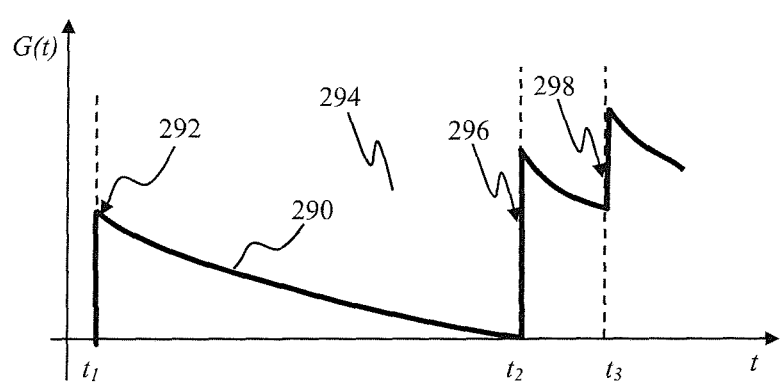
FIG. 2C is a plot depicting inhibitory trace time evolution for use in the spiking network of FIG. 1B, according to one implementation.

The time decay of inhibitory efficacy G(t) is illustrated by the curve 290 in FIG. 2C. At times $t_1$, $t_2$, $t_3$ the inhibitory trace 290 is incremented by amounts 292, 296, 298. The increment amount (e.g., the increment 292) may be configured in one variant using Eqn. 2. One or more increments of the inhibitory trace (e.g., the increments 292, 296, 298 of the trace 290 in FIG. 2C) may cause the inhibitory efficacy to exceed a threshold (e.g., the threshold 294 in FIG. 2C). When efficacy of the inhibitory connection (e.g., the connection 146_1 in FIG. 1B) is above the threshold, the neuron (e.g., the neuron 140_2 in FIG. 1B) may not be able to generate post-synaptic response even when the input stimulus may be sufficiently strong to cause post-synaptic response in the absence of inhibition.

Figure 3B:
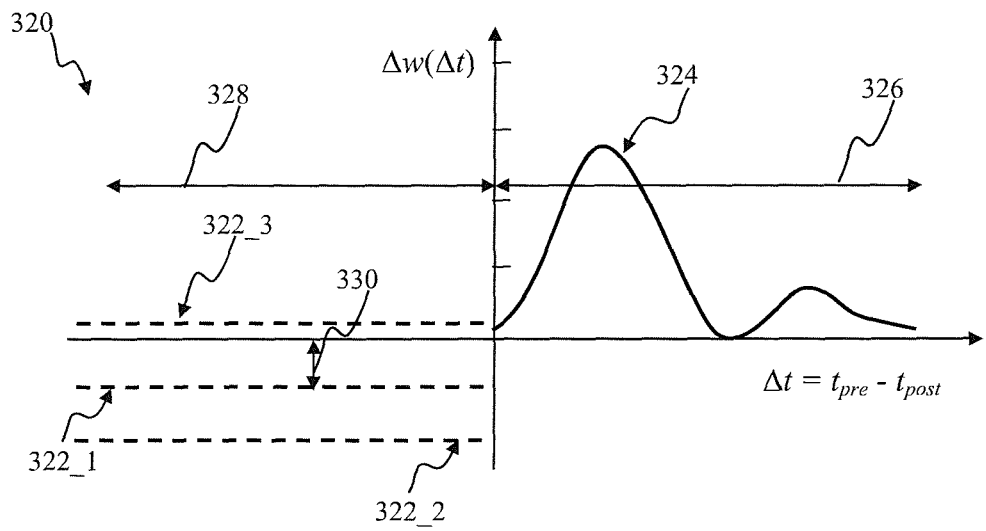
FIG. 3B is a plot depicting adaptively constructed spike-time dependent plasticity (STDP) for use in the spiking network of FIG. 1B, according to one implementation.

As illustrated in FIG. 3B, an STDP rule 320 for a feed-forward connection (e.g., the connection 104 in FIG. 1B) may comprise a post-synaptic portion and a pre-synaptic portion, as depicted by the curves 324, 322, respectively. In one or more implementations, the post-synaptic rule may correspond to pre-synaptic input occurring prior to the post-synaptic response so that $t_{pre} - t_{post}$ is positive. In some implementations, the post-synaptic rule may effectuate long-term potentiation of the respective connection, and may be referred to as the LTP rule. In one or more implementations, the pre-synaptic rule may correspond to pre-synaptic input occurring after the post-synaptic response so that $t_{pre} - t_{post}$ is negative or zero. In some implementations, illustrated for example by the negative weight adjustment $\Delta w$ of the curves 322_1, 322_2 in FIG. 3B, the pre-synaptic rule may effectuate long-term depression of the respective connection, and may be referred to as the "LTD" rule. In some implementations, illustrated, for example, by the positive (albeit smaller) weight adjustment $\Delta w$ of the curve 322_2, compared to the LTP curve 324 in FIG. 3B, the pre-synaptic rule may effectuate long-term potentiation that is considerably smaller than the LTP. In one or more implementations, the magnitude 330 of the pre-synaptic rule (LTD) may be selected commensurate with the magnitude of the post-synaptic rule (LTP). In some implementations, a ratio of maximum magnitudes of the pre-synaptic rule to the post-synaptic rule may be selected between 0.25 and 4. In some implementations, a ratio of the area associated with the pre-synaptic rule to the area associated with the post-synaptic rule may be selected between 0.25 and 4.

The efficacy G of the incoming inhibitory connection (e.g., the connection 146_1 in FIG. 1B) may be utilized by the neuron (e.g., the neuron 140_2 in FIG. 1B) to modulate plasticity of the feed-forward input connections (e.g., the connection 104_4 in FIG. 1B). In one or more implementations, the modulation may comprise varying the weight adjustment level $\Delta w$ of the pre-synaptic rule portion, as illustrated by the family of curves 322_1, 322_2, 322_3 in FIG. 3B. In some implementations, the pre-synaptic rule portion may be configured based on efficacy w of the feed-forward connection. In some implementations, the pre-synaptic rule portion may be configured based on the efficacy G of the inhibitory connection. The pre-synaptic rule portion may be configured for example based on a statistical parameter associated with the post-synaptic rule portion. The statistical parameter may comprise mean, median, a percentile, max, and/or other parameter. In some implementations, the pre-synaptic rule $W^{pre}$ may be configured as follows:

$$W^{pre} = -D \langle W^{post} \rangle (E+w)(H+G) \quad \text{(Eqn. 4)}$$

where:
$\langle W^{post} \rangle$ denotes the statistical parameter associated with the post-synaptic rule portion;
D is a weight scaling coefficient (e.g., determining the weight adjustment level 330 in FIG. 3B);
E, H, are scaling parameters associated with the efficacies of feed-forward connection and inhibitory connections, respectively.

In some implementations, the pre-synaptic rule $W^{pre}$ may be configured as follows:

$$W^{pre} = -D1 \langle W^{post} \rangle (1+Pw+QG) \quad \text{(Eqn. 5)}$$

where:
D1 is a weight scaling coefficient (e.g., determining the weight adjustment level 330 in FIG. 3B);
P, Q, are scaling parameters associated with the efficacies of feed-forward connection and inhibitory connections, respectively.

Figure 4:
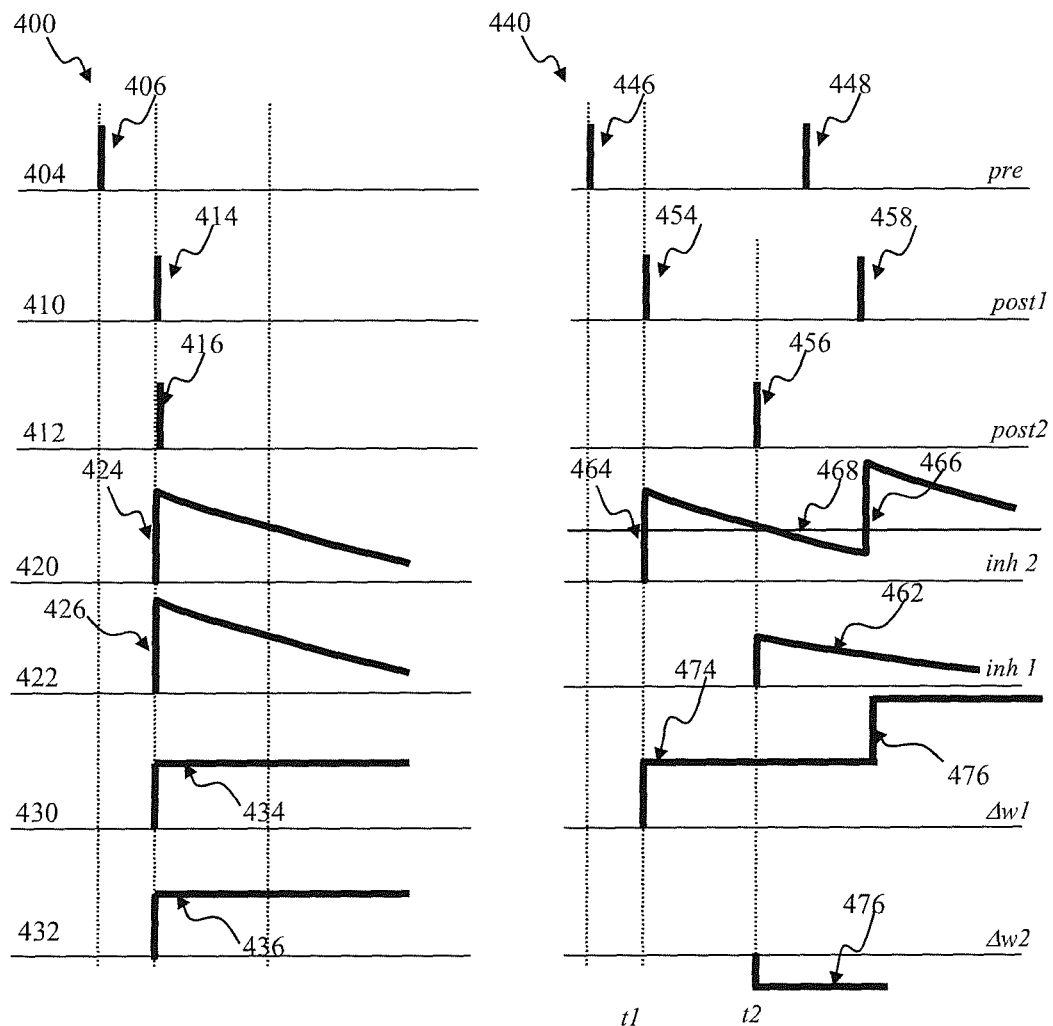
FIG. 4 is a timing diagram depicting activity-based plasticity modulation mechanism, in accordance with one or more implementations.

Plasticity modulation and/or mutual inhibition that are based on neighbor activity may advantageously provide an input differentiation mechanism via repulsion, as illustrated and described with respect to FIG. 4. Such mechanism may prevent multiple neurons to respond to the same input (as shown by the panel 440 in FIG. 4), thereby facilitating emergence of more diverse receptive fields as compared to the neuron operation of the prior art (as shown by the panel 400 in FIG. 4).

The traces 404, 410, 412, 420, 422, 430, 432 depict the feed-forward pre-synaptic input, the post-synaptic output of the first and second neurons, the inhibitory traces of the first and the second neurons, and the weight adjustment of the feed-forward pre-synaptic connections of the first and the second neurons, respectively. The first and the second neurons may comprise, for example, the neurons 140_1, 140_2 of the network 130 of FIG. 1B.

Absent the activity-based modulated plasticity mechanism described herein, the neurons may generate post-synaptic responses 414, 416. Based on the post-synaptic responses, activity-based inhibitory traces (e.g., efficacy of the inhibitory connections 146_1, 146_2 in FIG. 1B) may be incremented, as illustrated by the curves 424, 426. The inhibitory traces may comprise for example an exponential time-decay. In accordance with, for example, Eqn. 3. Based on the post-synaptic responses 414, 416, efficacy of synaptic connections 430, 432 providing the pre-synaptic input 404 may be increased, as illustrated by the curves 434, 436 in FIG. 4. As shown in the panel 400 of FIG. 4, both neurons 410, 412 operating in accordance with the plasticity mechanism of the prior art may develop the same (or similar) receptive fields as characterized by the neurons response to the same input stimulus. Accordingly, the network of the prior art may not develop adequate receptive field variety, and may exhibit limited response diversity.

Contrast the prior art network operation of the panel 400 with the network operation comprising activity-based modulated plasticity of the present disclosure, illustrated in the panel 440 of FIG. 4. In the latter, one of the neurons (e.g., the neuron 410 in FIG. 4) may generate a post-synaptic response 454 at time t1 based on the feed-forward input 446. Accordingly, the inhibitory trace 420 from the neuron 410 to the neuron 412 may be incremented, as shown by the curve 464 in FIG. 4. Based on the post-synaptic response 454, the efficacy of synaptic connection 430 providing the pre-synaptic input 446 may be increased, as illustrated by the curve 474 in FIG. 4. As long as the inhibitory efficacy may remain above the inhibitory threshold shown by the line 468 in FIG. 4, the neuron 412 may be inhibited from responding to the feed-forward input 446. When the inhibitory efficacy 464 drops below the threshold 468 at time t2, the neuron 412 may generate post-synaptic response 456. It is noteworthy that, while the neurons of the prior art may respond substantially simultaneously (e.g., the spikes 414, 416 in FIG. 4), the responses 464, 456 in the panel 440 are in contrast separated by a lag. Based on the post-synaptic response 456, the efficacy of synaptic connection 432 providing the pre-synaptic input 446 to the neuron 412 may be adjusted. In one or more implementations, the adjustment may comprise modulated pre-synaptic rule 322 of FIG. 3B. The adjustment may comprise for instance a connection depression, as illustrated by the curve 476 in FIG. 4.

Subsequent to time t2 in FIG. 4, the feed-forward connection 430 of the neuron 410 is potentiated, while the feed-forward connection 432 of the neuron 412 is depressed. Accordingly, the one neuron 410 may respond to subsequent feed-forward input 448 while the other neuron 412 may remain silent. The activity based plasticity mechanism illustrated in FIG. 4 may cause further potentiation 466 of the inhibitory trace 468 and potentiation 476 of the feed-forward synaptic connection 430. The exemplary activity-based plasticity mechanism illustrated in FIG. 4 may cause neuron specialization, and aid emergence of diverse receptive fields within the network. By way of a non-limiting illustration, the neuron 412 may subsequently begin responding (not shown) to feed-forward inputs that may contain representations of other objects and/or features.

In some implementations, inhibitory trace adjustment (e.g., the adjustment 464) may be based on a pre-determined similarity measure (e.g., the similarity measure 280 in FIG. 2B). In some implementations, inhibitory trace adjustment may be based on a dynamically determined similarity measure (e.g., the similarity measure 270 in FIG. 2B). The similarity measure may comprise for instance a cross-correlogram, cross-correlation, convolution, deconvolution, convolution, mutual information, and/or other measure of similarity between output of two or more post-synaptic neurons receiving the same (or similar) feed-forward input.

Referring now to FIGS. 5-8, exemplary implementations of adaptive plasticity methods according to the disclosure are described. In some implementations, the methods of FIGS. 4-6 may be used, for example, for operating the neurons 102 of FIG. 1A and/or neurons 140 of FIG. 1B. The various exemplary methods of FIG. 5-8 may be implemented in a connection (e.g., the connection 104, 124 of FIG. 1A and/or connections 146 of FIG. 1B). The methods of FIG. 5-8 may be implemented in sensory processing apparatus, comprising one or more spiking neuron networks as described with respect to FIG. 10, infra, thereby advantageously aiding, inter alia improving the speed and or quality of learning, potentially requiring fewer neurons to represent a given input, as well as learning temporally stable patterns.

Figure 5:
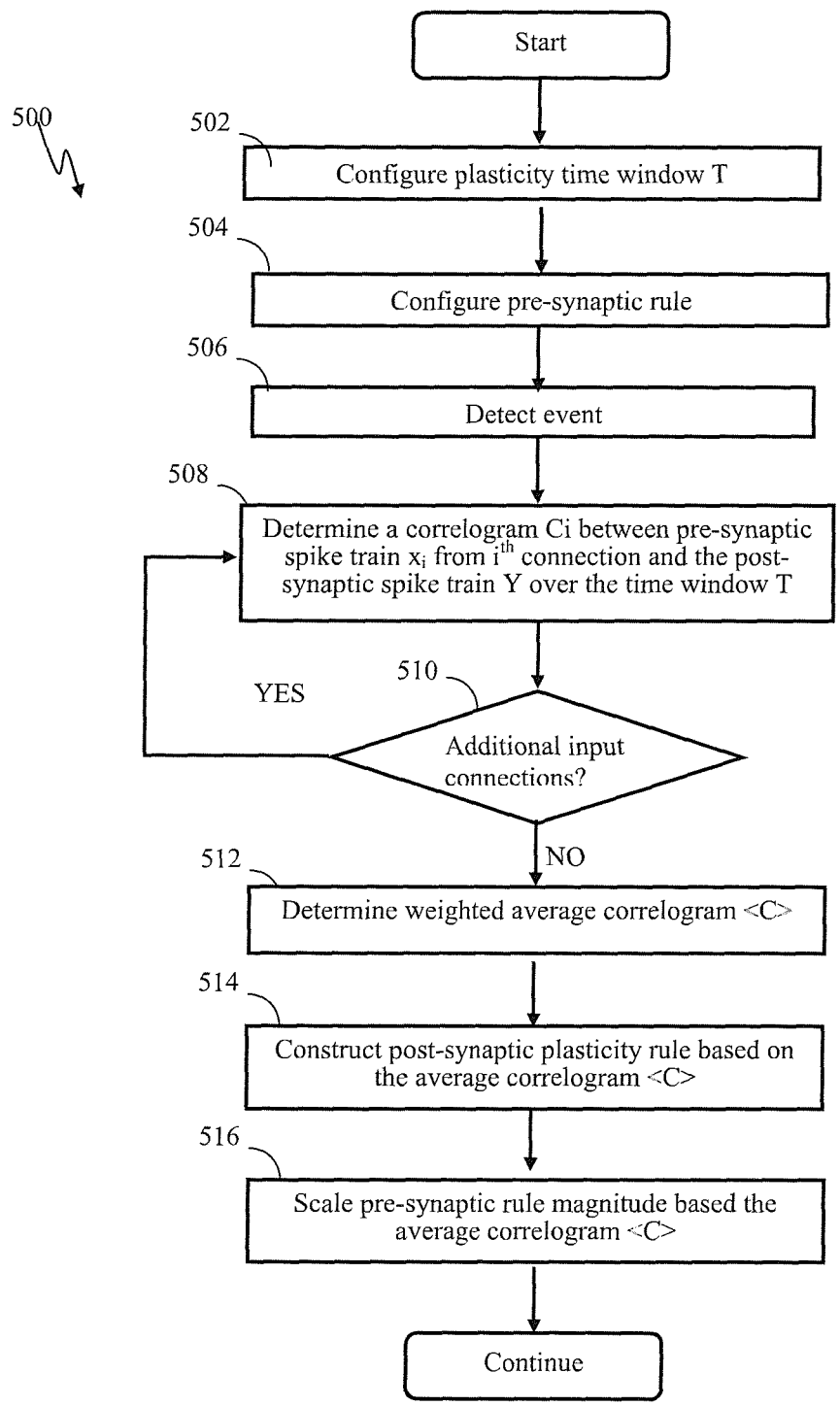
FIG. 5 is a logical flow diagram illustrating a method of determining adaptive plasticity for a spiking neuron comprising multiple input connections, in accordance with one implementation.

FIG. 5 illustrates a method of determining adaptive plasticity for a spiking neuron comprising multiple input connections, in accordance with one implementation.

At step 502 of the method 500, plasticity time window is configured. In some implementations, the post-synaptic rule may cause LTP while the pre-synaptic rule may cause LTD. The pre-synaptic rule and the post-synaptic rule may be characterized for example by the same time extent T. The pre-synaptic rule and the post-synaptic rule may also or alternatively comprise different time extents Tp, Td.

At step 504, the pre-synaptic rule may be configured. In one or more implementations, the pre-synaptic rule may comprise a constant, a gradually increasing and/or decreasing function (e.g., the functions 302_1, 302_2 illustrated in FIG. 3A).

At step 506, an event is detected. In some implementations, the event may comprise post-synaptic spike generation by the neuron. The event may comprise for instance an external event (e.g., reinforcement signal); a timer event (e.g., for cyclic updates); a buffer overflow event (e.g., indicative of a memory buffer, storing, for example, pre-synaptic and/or post-synaptic spike history) being full or nearly full, etc.

Responsive to the event, at step 508, a correlogram $C_i$ between pre-synaptic spike train $x_i$ from $i^{th}$ connection and the post-synaptic spike train Y over the time window T may be determined. In one implementation, the correlogram determination may comprise:

partitioning the time window into M bins;
identifying number $n_m$ of pre-synaptic inputs xi associated with individual $m^{th}$ bin, m=1−M; and
incrementing value of $m^{th}$ bin by $n_m$.

It will be appreciated by those skilled in the arts that other similarity or even different measures may be employed at step 508 in place and/or along with the correlogram, such as, for example, cross-correlation, mutual information, and/or convolution.

At step 510, a check may be performed if inputs form other connections need to be processed. When data from additional connections exist, the method 500 may return to step 508.

When no additional data are present, the method 500 may proceed to step 512, where average correlogram may be determined as a weighted average:

$$\langle C \rangle = \Sigma_{i=1}^{N}(a_i C_i) \quad \text{(Eqn. 6)}$$

where ai comprise the weights. The individual weights may be set to the same value. In some implementations, the weights may be set synapse-specific. For example, the weights could be 0 for very weak synaptic connections and 1 for strong connections.

At step 514, the post-synaptic rule portion of the STDP rule (e.g., the rule 304 in FIG. 3A) may be determined using the causal (tpre<tpost) portion of the average correlogram <C> of Eqn. 6.

At step 516, the magnitude of the pre-synaptic rule portion of the STDP rule (e.g., the magnitude 310 of the rule 302_1 in FIG. 3A) may be determined. In some implementation the magnitude may be based on a statistical parameter (e.g., mean, median, percentile, max, of the LTP rule portion).

Figure 6A:
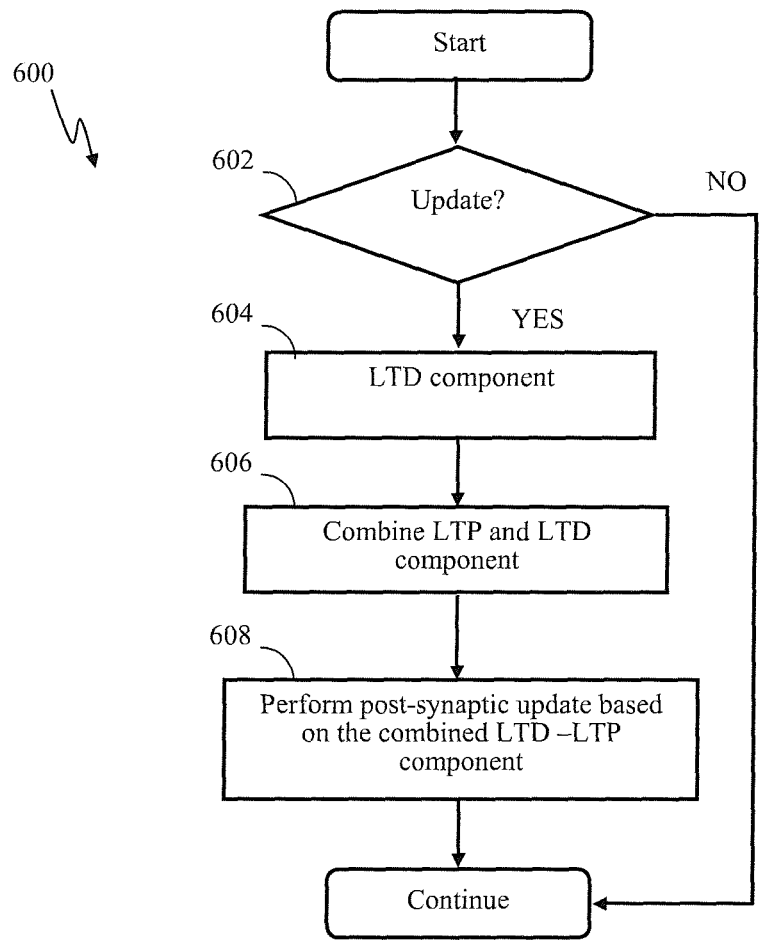
FIG. 6A is a logical flow diagram illustrating a method of connection plasticity update based on the adaptive STDP rule, in accordance with one implementation.

FIG. 6A illustrates a method of connection plasticity update based on the adaptive STDP rule, in accordance with one implementation.

At step 602, a determination may be made whether the update is to be performed. In one or more implementations, the update may be based on a post-synaptic spike by the neuron. The update may be based for example on an external event (e.g., reinforcement signal); a timer event (e.g., for cyclic updates); a buffer overflow event (e.g., indicative of a memory buffer, storing, for example, pre-synaptic and/or post-synaptic spike history) being full or nearly full, etc.

When the update is to be performed, the method may proceed to step 604, where pre-synaptic update may be performed. In some implementations, the pre-synaptic update may comprise the LTD rule (e.g., the rule determined at step 516 of FIG. 5 and/or rule 302 of FIG. 3A).

At step 606, the LTP and the LTD rules (e.g., the rules 304, 302 of FIG. 3A) may be combined to produce the post-rule. In some implementations the post-rule may be exclusively LTP based or may be a combination of both LTP and LTD. The combination may be used in order increase the selectivity of which temporal patterns are potentiated.

At step 608, the post-synaptic update may be performed. In some implementations, the post-synaptic update may comprise the combined rule.

Figure 6B:
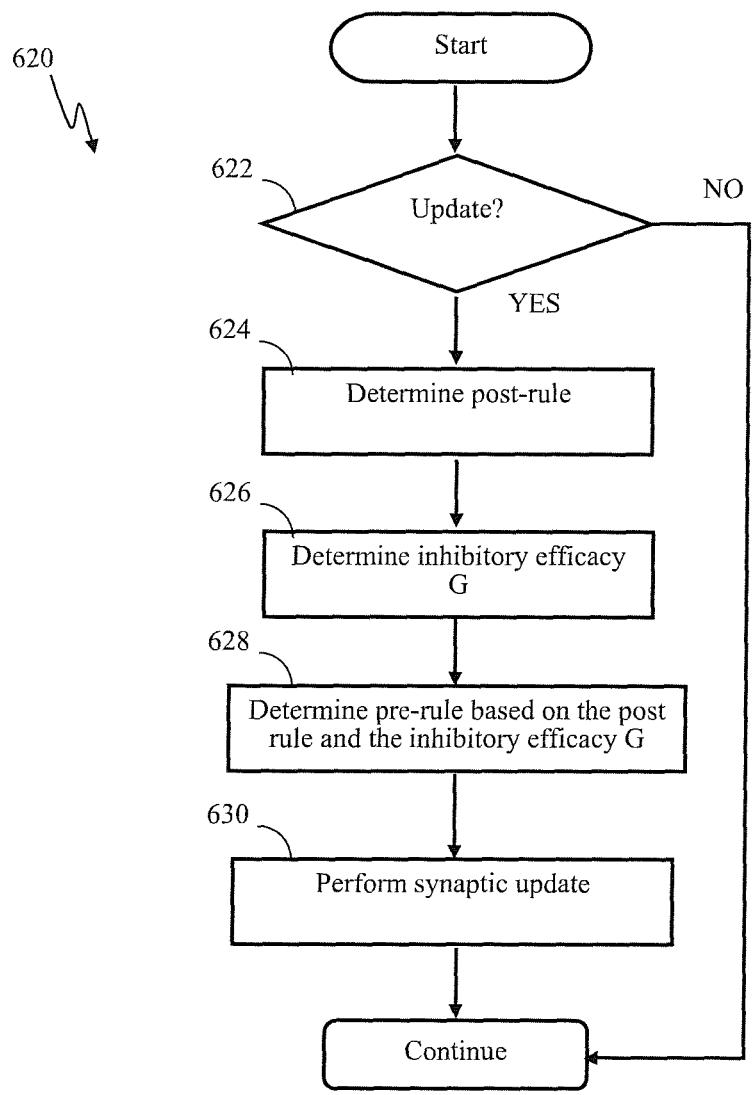
FIG. 6B is a logical flow diagram illustrating a method of connection plasticity update based on the modulated plasticity rule, in accordance with one implementation.

FIG. 6B illustrates a method of network update comprising modulated plasticity, in accordance with one implementation.

At step 622, a determination may be made whether the update is to be performed. In one or more implementations, the update may be based on a post-synaptic spike by the neuron. The update may additionally or alternatively be based on an external event (e.g., reinforcement signal); a timer event (e.g., for cyclic updates); a buffer overflow event (e.g., indicative of a memory buffer, storing, for example, pre-synaptic and/or post-synaptic spike history) being full or nearly full, etc.

When the update is to be performed, the method may proceed to step 644 where the post-synaptic portion of the STDP rule may be determined. In some implementations, the post-synaptic portion of the rule may comprise an adaptively determined rule 304 of FIG. 3A. It will be appreciated by those skilled in the arts that other post-synaptic rules may be equally useful and applicable with the disclosure, including, for example and without limitation, the STDP rules described in co-owned U.S. patent application Ser. No. 13/488,106, entitled "SPIKING NEURON NETWORK APPARATUS AND METHODS", filed Jun. 4, 2012, a co-owned U.S. patent application Ser. No. 13/488,144, entitled "SPIKING NEURON NETWORK APPARATUS AND METHODS", filed Jun. 4, 2012, a co-owned U.S. patent application Ser. No. 13/541,531, entitled "CONDITIONAL PLASTICITY SPIKING NEURON NETWORK APPARATUS AND METHODS", filed Jul. 3, 2012, each of the foregoing incorporated supra.

At step 626, inhibitory efficacy may be determined. In some implementations, the inhibitory efficacy may be based on an efficacy of the inhibitory connection (e.g., the efficacy 420, 422 of FIG. 4) due to activity of one or more neighboring neurons. In one or more implementations, the inhibitory efficacy G may be configured in accordance with Eqn. 2-Eqn. 3.

At step 628, the pre-synaptic rule portion may be determined. In some implementations, the pre-synaptic rule may be based on based on a combination of the post-synaptic rule and the inhibitory efficacy G. The pre-synaptic rule may also be based on based on a combination of the post-synaptic rule, efficacy of one or more connections providing feed-forward input (e.g., the connections 104 in FIG. 1B), and the inhibitory efficacy G. In some implementations, the pre-synaptic rule may be configured in accordance with Eqn. 4-Eqn. 5.

At step 630, a synaptic update may be performed. The synaptic update may comprise for example the post-synaptic and/or pre-synaptic rule.

Figure 7:
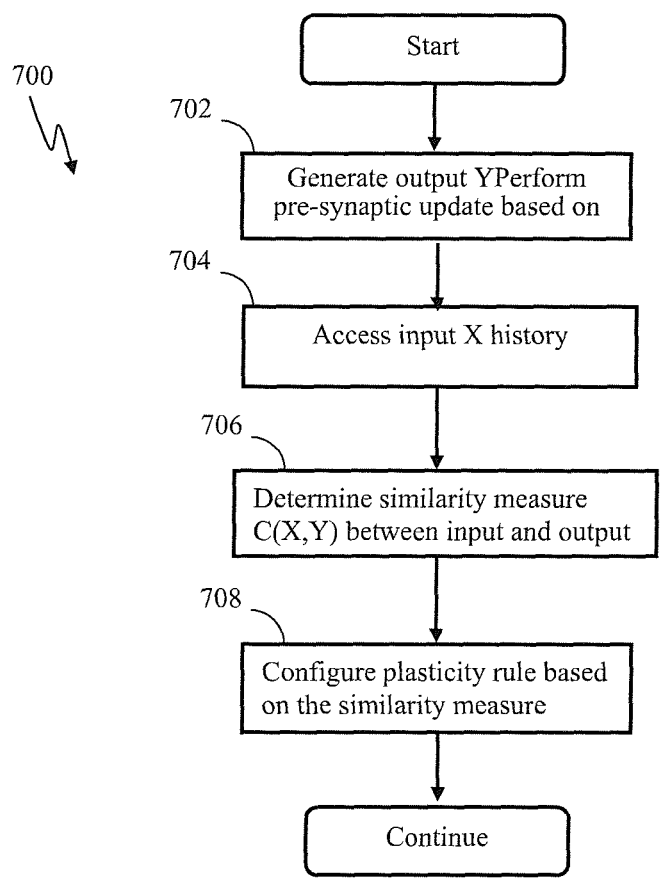
FIG. 7 is a logical flow diagram illustrating determination of an adaptive plasticity mechanism, in accordance with one implementation.

FIG. 7 illustrates a method of determining adaptive plasticity for a spiking neuron based on a similarity measure between neuron input and output, in accordance with one implementation.

At step 702 of method 700, a neuron may generate an output Y. In some implementations, the output may be generated in accordance with a deterministic spike response model, as described for example in U.S. patent application Ser. No. 13/152,119, entitled "APPARATUS AND METHODS FOR TEMPORALLY PROXIMATE OBJECT RECOGNITION", filed on Jun. 2, 2011, incorporated herein by reference in its entirety. In some implementations, the spike response process may comprise adaptive threshold adjustment as described in U.S. patent application Ser. No. 13/623,820, entitled "APPARATUS AND METHODS FOR ENCODING OF SENSORY DATA USING ARTIFICIAL SPIKING NEURONS", filed on Sep. 20, 2012 incorporated herein by reference in its entirety. In some implementations, the neuron may be operable in accordance with stochastic process, such as for example that described in U.S. patent application Ser. No. 13/487,499, entitled "STOCHASTIC APPARATUS AND METHODS FOR IMPLEMENTING GENERALIZED LEARNING RULES", filed on Jun. 4, 2012, incorporated herein by reference in its entirety.

At step 704 of the method 700, history of inputs into the neuron may be accessed. In some implementations, the history may comprise one or more spikes 106_1, 106_1, 106_1 in FIG. 1A. In some implementations, the history may comprise time data of pre-synaptic spikes stored in a synaptic memory buffer, such as described for example in U.S. patent application Ser. No. 13/239,259, entitled "APPARATUS AND METHOD FOR PARTIAL EVALUATION OF SYNAPTIC UPDATES BASED ON SYSTEM EVENTS", filed on Sep. 21, 2011, incorporated supra.

At step 706, a similarity measure C(X,Y,t) between the output (X) and the input (Y) as a function of time shift (t) may be determined. In some implementations, the similarity measure may use correlation measured at different time shifts; e.g., a correlogram, as described with respect to FIG. 2A, supra. In one or more implementations, the similarity measure may use mutual information at different time shifts as determined as follows:

$$I(X;Y) = \sum_{y \in Y} \sum_{x \in X} p(x, y) \log\left(\frac{p(x, y)}{p(x)p(y)}\right), \quad \text{(Eqn. 7)}$$

where:

p(x,y) is the joint probability distribution function of X and Y; and p(x) and p(y) are the marginal probability distribution functions of X and Y respectively.

At step 708, plasticity rule may be configured based on the similarity measure. In some implementations, the plasticity rule determination may comprise the approach described with respect to FIGS. 2A, 3A, supra, although other approaches may be used with equal success.

Figure 8:
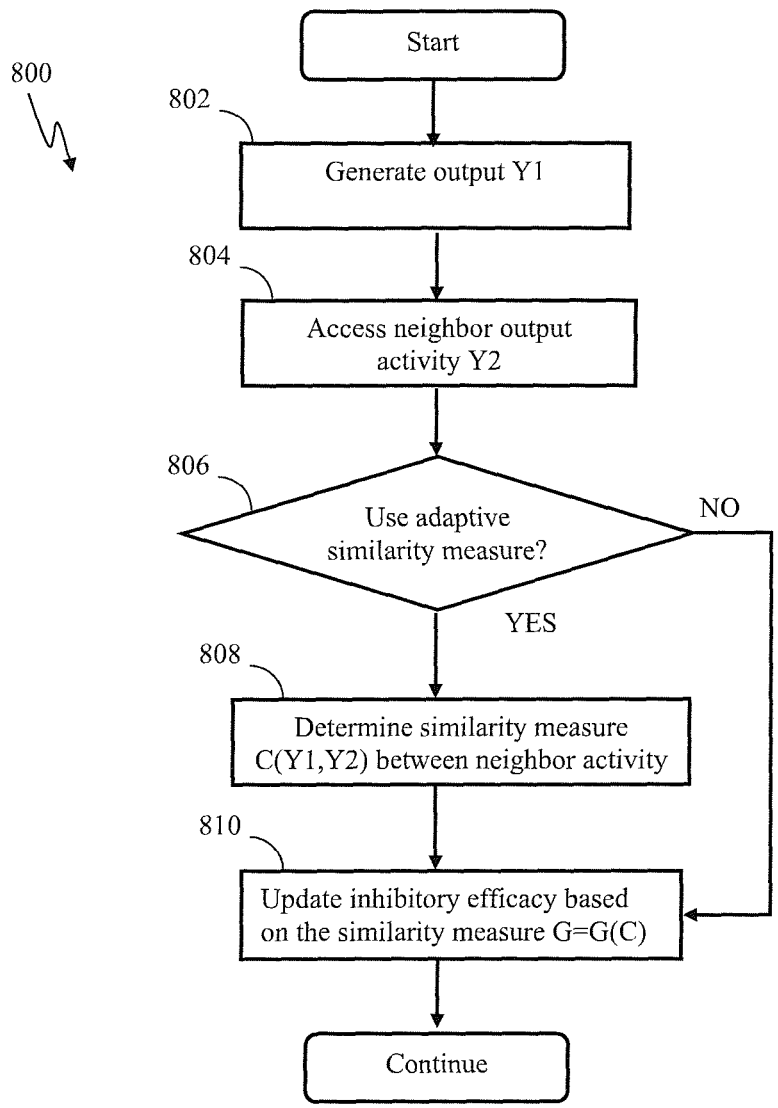
FIG. 8 is a logical flow diagram illustrating determination of neighbor activity based plasticity mechanism, in accordance with one implementation.

FIG. 8 illustrates a method of determining inhibitory efficacy based on activity of two or more neighboring neurons, in accordance with one implementation.

At step 802 of method 800, a neuron (e.g., the neuron 410 in FIG. 4) may generate an output Y1. In some implementations, the output may be generated in accordance with a deterministic spike response model, such as for example that described for example in U.S. patent application Ser. No. 13/152,119, entitled "APPARATUS AND METHODS FOR TEMPORALLY PROXIMATE OBJECT RECOGNITION", filed on Jun. 2, 2011, incorporated herein by reference in its entirety. In some implementations, the spike response process may comprise an adaptive threshold adjustment such as described in U.S. patent application Ser. No. 13/623,820, entitled "APPARATUS AND METHODS FOR ENCODING OF SENSORY DATA USING ARTIFICIAL SPIKING NEURONS", filed on Sep. 20, 2012, incorporated herein by reference in its entirety. The neuron may also be operable in accordance with stochastic process, such as for example that described in U.S. patent application Ser. No. 13/487,499, entitled "STOCHASTIC APPARATUS AND METHODS FOR IMPLEMENTING GENERALIZED LEARNING RULES", filed on Jun. 4, 2012, incorporated herein by reference in its entirety.

At step 804 of the method 800, activity of one or more neighboring neurons Y2 (e.g., the neuron activity 412 in FIG. 4) may be accessed. In some implementations, the history may comprise one or more spikes 414 in FIG. 4. In some implementations, the history may comprise time data of post-synaptic spikes stored in a synaptic memory buffer and/or neuron memory buffer, for example such as that described in U.S. patent application Ser. No. 13/239,259, entitled "APPARATUS AND METHOD FOR PARTIAL EVALUATION OF SYNAPTIC UPDATES BASED ON SYSTEM EVENTS", filed on Sep. 21, 2011, incorporated herein by reference in its entirety.

At step 806, a determination may be made as to whether an adaptively determined similarity measure may be utilized for inhibitory efficacy adjustment.

When the adaptive similarity measure is utilized, the method proceeds to step 808, where a similarity measure C(Y1,Y2) between the outputs Y1,Y2 of two (or more) neighboring may be deter mined. In some implementations, the similarity measure may use correlation measured at different time shifts, i.e. a correlogram, as described with respect to FIG. 2B, supra. In one or more implementations, the similarity measure may be based on the mutual information between two outputs Y1, Y2, such as for instance according to Eqn. 7 herein.

At step 810, inhibitory efficacy may be updated. In some implementations, the efficacy G may be updated using methodology described with respect to Eqn. 2 above. The inhibitory efficacy may also be updated using a pre-defined similarity measure (e.g., the measure 280 of FIG. 2B).

Performance

Figure 9A:
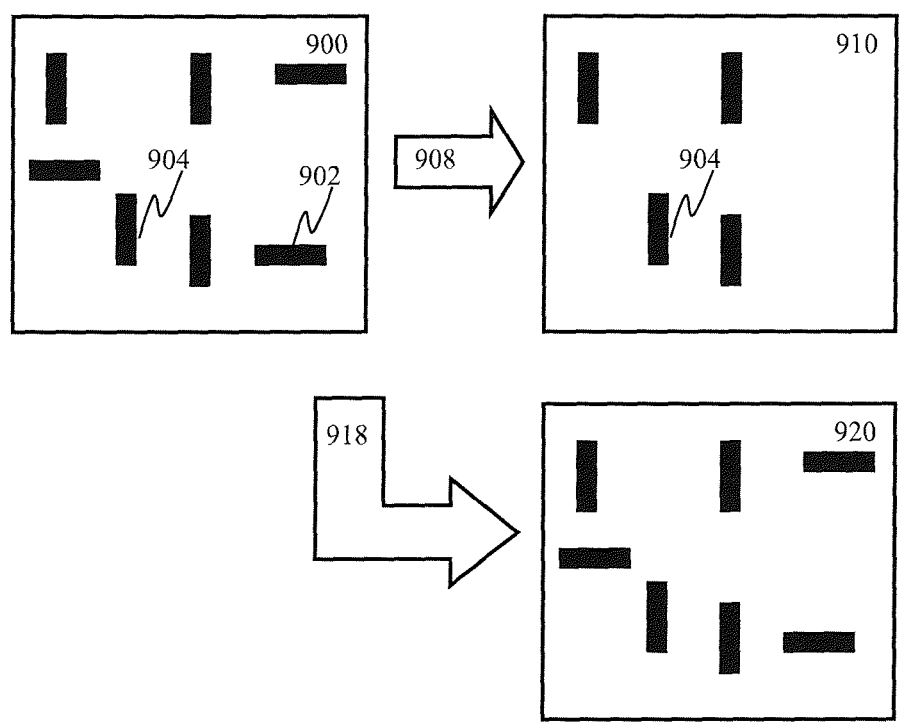
FIG. 9A is a graphical illustration depicting performance of a sensory processing apparatus comprising modulated plasticity mechanism in accordance with one implementation.

FIG. 9A illustrates performance of a learning object recognition apparatus comprising adaptive plasticity mechanism. A signal processing apparatus (e.g., the apparatus 1000 of FIG. 10 described in detail below) may receive one or more input frames, such as the frame 900 of FIG. 9A. The input frames may comprise representations of one or more objects, such as the triangles 902 and the squares 904 of frame 900.

The circular panels in FIG. 9A depict receptive fields of the post-synaptic neurons of the network that may develop during learning by the network based on the input (e.g., one or more frames 900). The solid dots 918 in FIG. 9A denote responses of the one or more post-synaptic neurons.

The receptive fields 910, 914, 916 depict performance of a network comprising plasticity mechanism of the prior art. As shown by the receptive fields 910, 914, 916, the network is capable of learning only a single feature (e.g., the triangle 902). Furthermore, the prior art plasticity mechanism may cause one or more post-synaptic neurons to generate erroneous responses, as illustrated by the solid circle 918 in FIG. 9A.

Contrast the network responses 910, 914, 916 with the receptive 920, 922, 924, 926 corresponding to the network comprising an exemplary adaptive plasticity mechanism of the present disclosure. The receptive fields 920, 922, 924, 926 illustrate that the network (e.g., comprising one or more neurons 110 of FIG. 1) is capable of learning both the triangular objects (as shown by the neuron responses in the panels 920, 922) as well as the square objects (as shown by the neuron responses in the panels 924, 926). In addition, the performance of the network comprising the exemplary inventive adaptive plasticity mechanism is characterized by a lower number of erroneous responses.

Figure 9B:
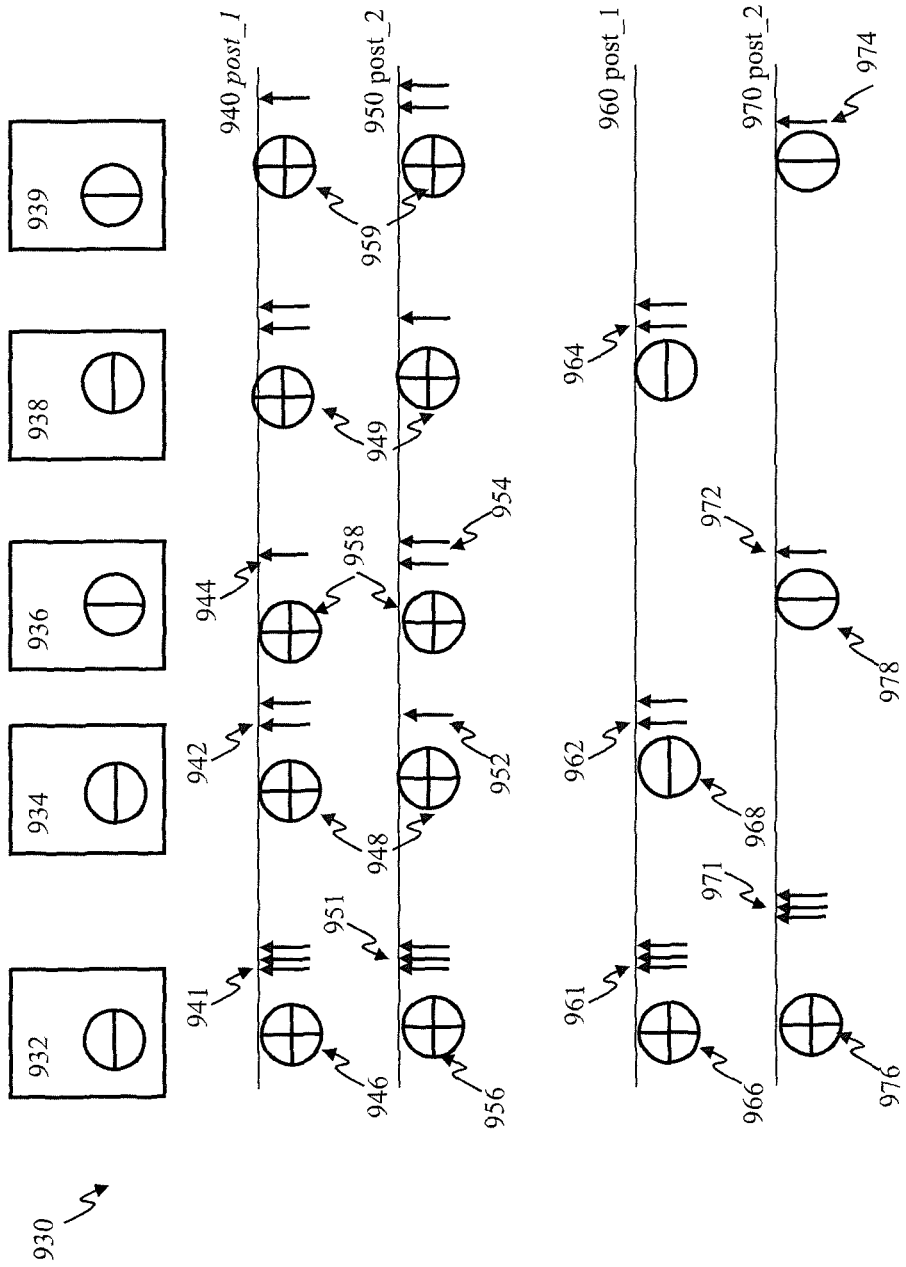
FIG. 9B is a graphical illustration depicting object detection by a sensory processing apparatus comprising modulated plasticity mechanism in accordance with one implementation.

FIG. 9B illustrates the performance of a signal processing apparatus comprising an exemplary activity-based modulated plasticity mechanism, such as that described above with respect to FIGS. 2B and 3B. The signal processing apparatus (e.g., the apparatus 1000 of FIG. 10 described in detail below) may receive sensory input 930, such as the frames 932, 934, 936, 938 of FIG. 9B. The input frames may comprise representations of one or more objects, such as the vertical bar | in the frames 936, 939 and the horizontal bar—in the frames 932, 934, 938.

The traces 940, 950 depict the post-synaptic activity of two neurons of the prior art that may receive the input 930. Initially, both neurons 940, 950 of the prior art may respond to one or more features 946, 956, as indicated by the responses 941, 951 to the input 932. Subsequently, the neurons 940, 950 of the prior art may respond alternately to one (or both) features as indicated by the responses 942, 944, 952, 954. Accordingly, the neurons 940, 950 of the prior art may fail to develop feature selectivity, as illustrated by the receptive fields 948, 958, 949, 959 comprising the vertical and the horizontal bars.

Contrast the activity on the traces 940, 950 with the activity of the traces 960, 970 depicting the post-synaptic activity of two neurons operated in accordance with an exemplary implementation of the activity-based modulated plasticity mechanism of the present disclosure.

Initially, the neuron 960 may respond to one or more features 966 of the input 932, as indicated by the response 961. The activity-based inhibition mechanism (such as described with respect to FIG. 4 above) may delay response 971 by the neuron 970 to the feature(s) 976. The delayed response by the neuron 970 may cause: (i) depression of the input connection into the neuron 970 in accordance with the activity-based modulation of the pre-synaptic plasticity rule, as described in detail with respect to FIG. 4; and (ii) increase of the inhibitory efficacy for the neuron 960 (e.g., the curve 462 in FIG. 4). When the neurons 960, 970 receive the subsequent input frame 934 comprising both the vertical bar and the horizontal bar, the neuron 960 may respond to one of the features, e.g., the horizontal bar 968, depicted by the response 962. This may be due, at least partly, to the inhibitory efficacy on the neuron 960 due to activity of the neuron 970. The response 962 may (i) potentiate the input connection into the neuron 960 (e.g., the increment 476 in FIG. 4); and (ii) increment inhibitory efficacy for the neuron 970 (e.g., the increment 466 in FIG. 4). The neuron 970 may respond to a different feature, e.g., the vertical bar 978, depicted by the response 972. The activity based plasticity modulation may advantageously cause the receptive fields of the neurons 960, 970 to develop selectivity to the horizontal and vertical bars, respectively. The selective responses by the neurons 960, 970 are depicted by the responses 962, 964, and 972, 974, respectively, in FIG. 9B.

Exemplary Apparatus

Various exemplary spiking network apparatus implementing one or more of the methods set forth herein (e.g., using the exemplary adaptive plasticity mechanisms described above) are now described with respect to FIGS. 10-11D.

Figure 10:
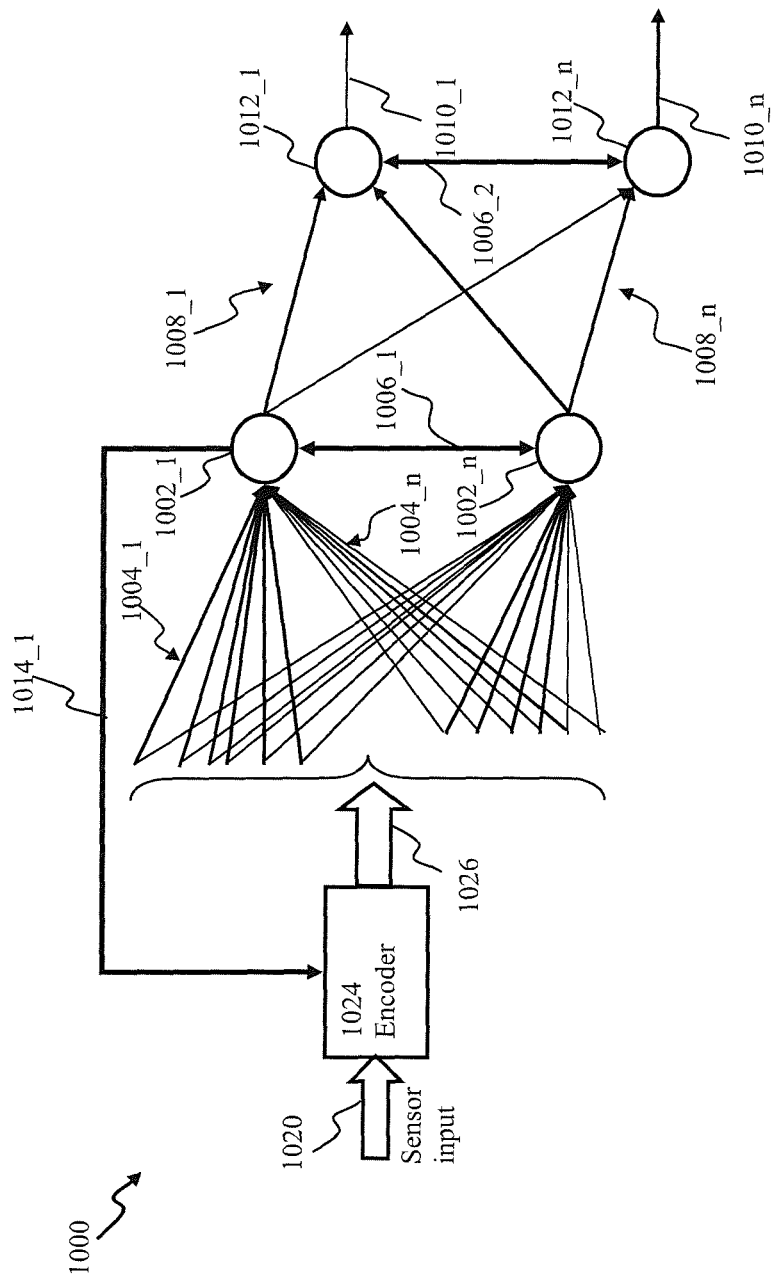
FIG. 10 is a block diagram illustrating a sensory processing apparatus comprising adaptive plasticity mechanism in accordance with one implementation.

One apparatus for processing of sensory information (e.g., visual, audio, somatosensory) using a spiking neural network (including one or more of the conditional plasticity mechanisms described herein) is shown in FIG. 10. The illustrated processing apparatus 1000 includes an input interface configured to receive an input sensory signal 1020. In some implementations, this sensory input comprises electromagnetic waves (e.g., visible light, IR, UV, etc.) entering an imaging sensor array (comprising RGCs, a charge coupled device (CCD), CMOS device, or an active-pixel sensor (APS)). The input signal in this example is a sequence of images (image frames) received from a CCD or CMOS camera via a receiver apparatus, or downloaded from a file. Alternatively, the image may be a two-dimensional matrix of RGB values refreshed at a 24 Hz frame rate. It will be appreciated by those skilled in the art that the above image parameters and components are merely exemplary, and many other image representations (e.g., bitmap, CMYK, grayscale, etc.) and/or frame rates are equally useful with the present disclosure.

The apparatus 1000 may also include an encoder 1024 configured to transform (encode) the input signal so as to form an encoded signal 1026. In one variant, the encoded signal comprises a plurality of pulses (also referred to as a group of pulses) configured to model neuron behavior. The encoded signal 1026 may be communicated from the encoder 1024 via multiple connections (also referred to as transmission channels, communication channels, or synaptic connections) 1004 to one or more neuronal nodes (also referred to as the detectors) 1002.

In the implementation of FIG. 10, different detectors of the same hierarchical layer are denoted by an "_n" designator, such that e.g., the designator 1002_1 denotes the first detector of the layer 1002. Although only two detectors (1002_1, 1002_n) are shown in FIG. 10 for clarity, it is appreciated that the encoder can be coupled to any number of detector nodes that is compatible with the detection apparatus hardware and software limitations. Furthermore, a single detector node may be coupled to any practical number of encoders.

In one implementation, each of the detectors 1002_1, 1002_n contain logic (which may be implemented as a software code, hardware logic, or a combination of thereof) configured to recognize a predetermined pattern of pulses in the encoded signal 1004, using for example any of the mechanisms described in U.S. patent application Ser. No. 12/869,573, filed Aug. 26, 2010 and entitled "SYSTEMS AND METHODS FOR INVARIANT PULSE LATENCY CODING", U.S. patent application Ser. No. 12/869,583, filed Aug. 26, 2010, entitled "INVARIANT PULSE LATENCY CODING SYSTEMS AND METHODS", U.S. patent application Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", U.S. patent application Ser. No. 13/152,084, filed Jun. 2, 2011, entitled "APPARATUS AND METHODS FOR PULSE-CODE INVARIANT OBJECT RECOGNITION", each incorporated herein by reference in its entirety, to produce post-synaptic detection signals transmitted over communication channels 1008. In FIG. 10, the designators 1008_1, 1008_n denote output of the detectors 1002_1, 1002_n, respectively.

In one implementation, the detection signals are delivered to a next layer of the detectors 1012 (comprising detectors 1012_l, 1012_m, 1012_k) for recognition of complex object features and objects, similar to the exemplary configuration described in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated herein by reference in its entirety. In this configuration, each subsequent layer of detectors is configured to receive signals from the previous detector layer, and to detect more complex features and objects (as compared to the features detected by the preceding detector layer). For example, a bank of edge detectors is followed by a bank of bar detectors, followed by a bank of corner detectors and so on, thereby enabling alphabet recognition by the apparatus.

Each of the detectors 1002 may output detection (post-synaptic) signals on communication channels 1008_1, 1008_n (with appropriate latency) that may propagate with different conduction delays to the detectors 1012. The detector cascade of the apparatus of FIG. 10 may contain any practical number of detector nodes and detector banks determined, inter alia, by the software/hardware resources of the detection apparatus and complexity of the objects being detected.

The sensory processing apparatus implementation illustrated in FIG. 10 may further comprise lateral connections 1006. In some variants, the connections 1006 are configured to communicate post-synaptic activity indications between neighboring neurons of the same hierarchy level, as illustrated by the connection 1006_1 in FIG. 10. In some variants, the neighboring neuron may comprise neurons having overlapping inputs (e.g., the inputs 1004_1, 1004_n in FIG. 10), so that the neurons may compete in order to not learn the same input features. In one or more implementations, the neighboring neurons may comprise spatially proximate neurons such as being disposed within a certain volume/area from one another on a 3-dimensional (3D) and or two-dimensional (2D) space.

The apparatus 1000 may also comprise feedback connections 1014, configured to communicate context information from detectors within one hierarchy layer to previous layers, as illustrated by the feedback connections 1014_1 in FIG. 10. In some implementations, the feedback connection 1014_2 is configured to provide feedback to the encoder 1024 thereby facilitating sensory input encoding, as described in detail in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated supra.

Figure 11A:
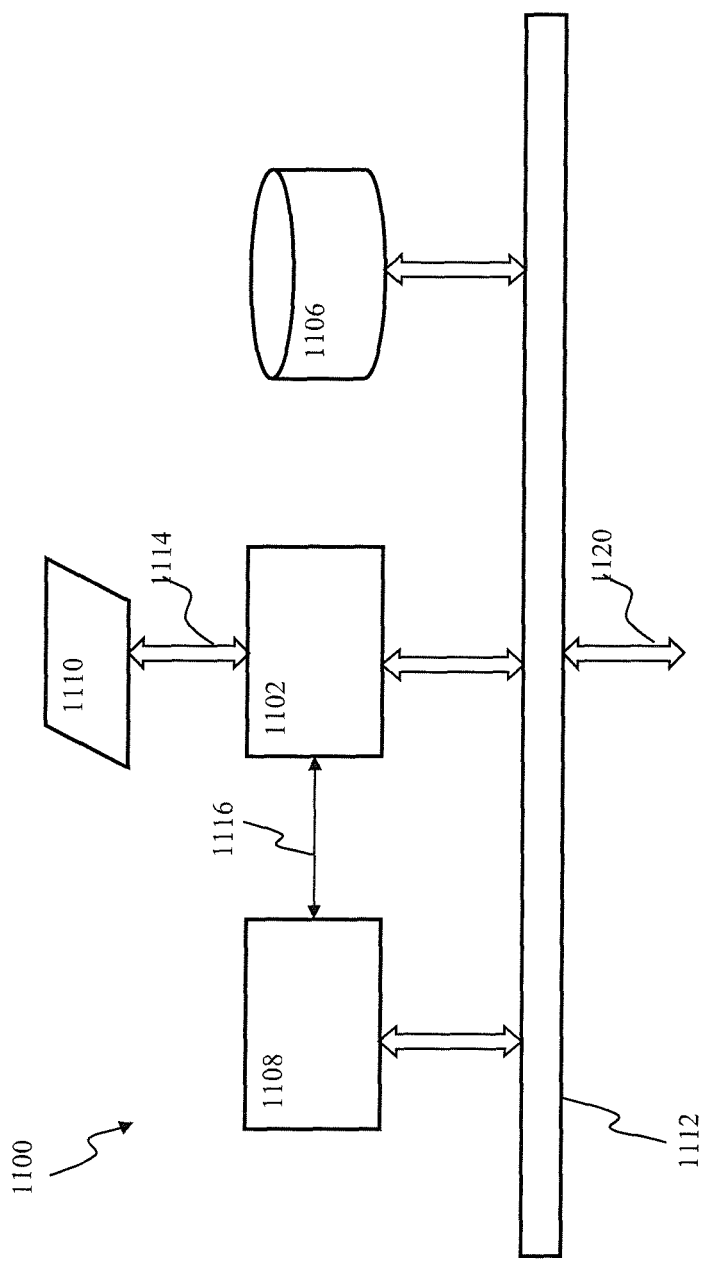
FIG. 11A is a block diagram illustrating a computerized system useful for, inter alia, providing an adaptive plasticity mechanism in a spiking network, in accordance with one implementation.

One particular implementation of the computerized neuromorphic processing system, adapted for operating a computerized spiking network (and implementing the exemplary plasticity methodology described supra), is illustrated in FIG. 11A. The computerized system 1100 of FIG. 11A comprises an input interface 1110, such as for example an image sensor, a computerized spiking retina, an audio array, a touch-sensitive input device, etc. The input interface 1110 is coupled to the processing block (e.g., a single or multi-processor block) via the input communication interface 1114. The system 1100 further comprises a random access memory (RAM) 1108, configured to store neuronal states and connection parameters (e.g., weights 108 in FIG. 1A), and to facilitate synaptic updates. In some exemplary implementations, synaptic updates are performed according to the description provided in, for example, in U.S. patent application Ser. No. 13/239, 255 filed Sep. 21, 2011, entitled "APPARATUS AND METHODS FOR SYNAPTIC UPDATE IN A PULSE-CODED NETWORK", incorporated herein by reference in its entirety.

In some implementations, the memory 1108 is coupled to the processor 1102 via a direct connection (memory bus) 1116. The memory 1108 may also be coupled to the processor 1102 via a high-speed processor bus 1112).

The system 1100 may further comprise a nonvolatile storage device 1106, comprising, inter alia, computer readable instructions configured to implement various aspects of spiking neuronal network operation (e.g., sensory input encoding, connection plasticity, operation model of neurons, etc.). The nonvolatile storage 1106 may be used for instance to store state information of the neurons and connections when, for example, saving/loading network state snapshot, or implementing context switching (e.g., saving current network configuration (comprising, inter alia, connection weights and update rules, neuronal states and learning rules, etc.) for later use, and loading of a previously stored network configuration.

In some implementations, the computerized apparatus 1100 is coupled to one or more external processing/storage/input devices via an I/O interface 1120, such as a computer I/O bus (PCI-E), wired (e.g., Ethernet) or wireless (e.g., Wi-Fi) network connection.

In another variant, the input/output interface comprises a speech input (e.g., a microphone) and a speech recognition module configured to receive and recognize user commands.

It will be appreciated by those skilled in the arts that various processing devices may be used with computerized system 1100, including but not limited to, a single core/multicore CPU, DSP, FPGA, GPU, ASIC, combinations thereof, and/or other processors. Various user input/output interfaces are similarly applicable to implementations of the disclosure including, for example, an LCD/LED monitor, touch-screen input and display device, speech input device, stylus, light pen, trackball, end the likes.

Figure 11B:
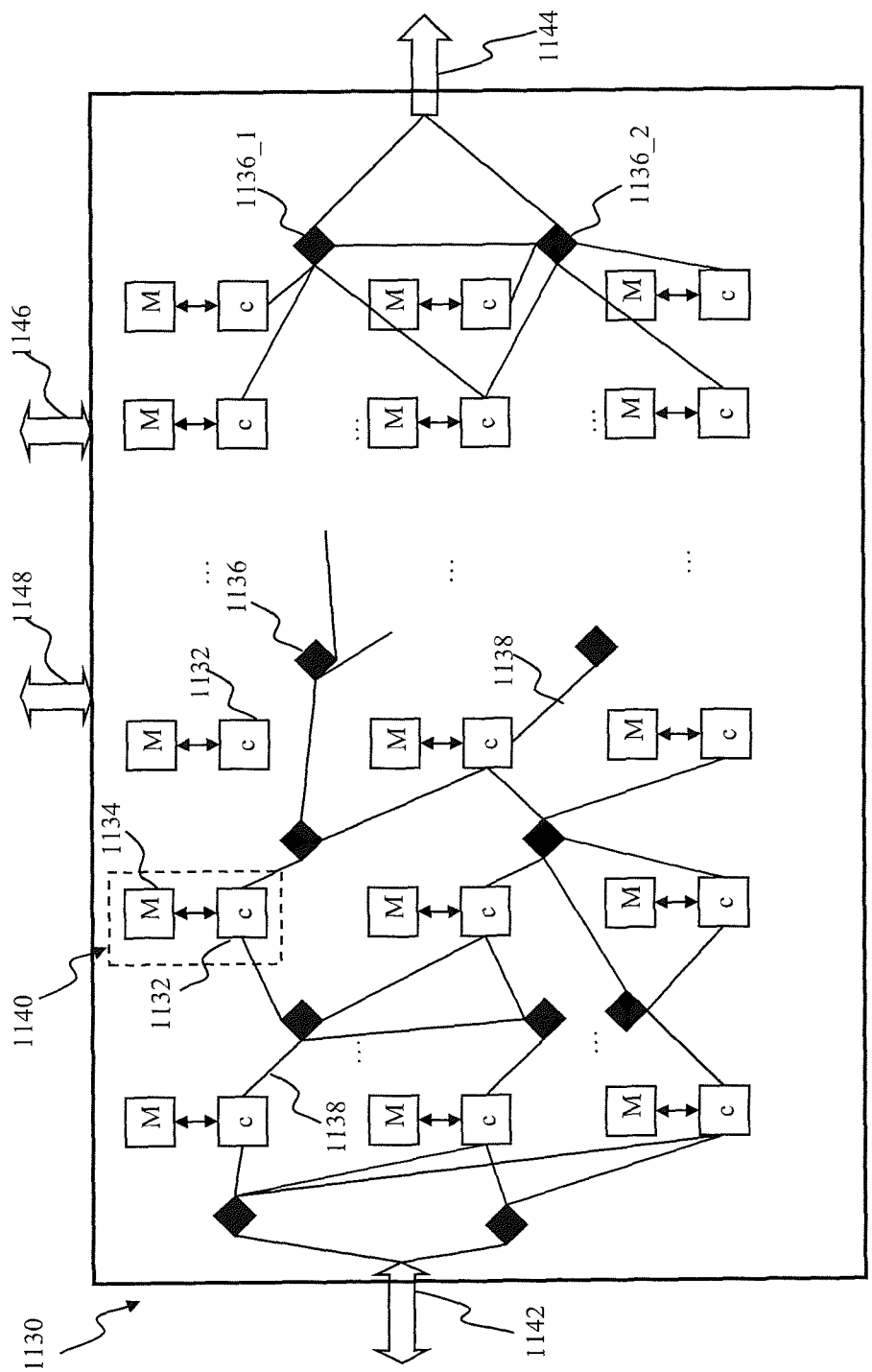
FIG. 11B is a block diagram illustrating a neuromorphic computerized system useful with, inter alia, adaptive plasticity mechanism in a spiking network, in accordance with one implementation.

Referring now to FIG. 11B, one implementation of neuromorphic computerized system configured to implement modulated plasticity mechanism in a spiking network is described in detail. The neuromorphic processing system 1130 of FIG. 11B comprises a plurality of processing blocks (micro-blocks) 1140, where each micro-block comprises a computing logic core 1132 and a memory block 1134. The logic core 1132 is configured to implement various aspects of neuronal node operation, such as the node model, and synaptic update rules (e.g., the I-STDP) and/or other tasks relevant to network operation. The memory block is configured to store, inter alia, neuronal state variables and connection parameters (e.g., weights, delays, I/O mapping) of connections 1138.

The micro-blocks 1140 are interconnected with one another using connections 1138 and routers 1136. As it is appreciated by those skilled in the arts, the connection layout in FIG. 11B is exemplary, and many other connection implementations (e.g., one to all, all to all, etc.) are compatible with the disclosure.

The neuromorphic apparatus 1130 is configured to receive input (e.g., visual input) via the interface 1142. In one or more implementations, applicable for example to interfacing with a computerized spiking retina or an image array, the apparatus 1130 may provide feedback information via the interface 1142 to facilitate encoding of the input signal.

The neuromorphic apparatus 1130 is configured to provide output (e.g., an indication of recognized object or a feature, or a motor command, e.g., to zoom/pan the image array) via the interface 1144.

The apparatus 1130, in one or more implementations, may interface to external fast response memory (e.g., RAM) via high bandwidth memory interface 1148, thereby enabling storage of intermediate network operational parameters (e.g., spike timing, etc.). The apparatus 1130 may also interface to external slower memory (e.g., Flash, or magnetic (hard drive)) via lower bandwidth memory interface 1146, in order to facilitate program loading, operational mode changes, and retargeting, where network node and connection information for a current task is saved for future use and flushed, and previously stored network configuration is loaded in its place.

Figure 11C:
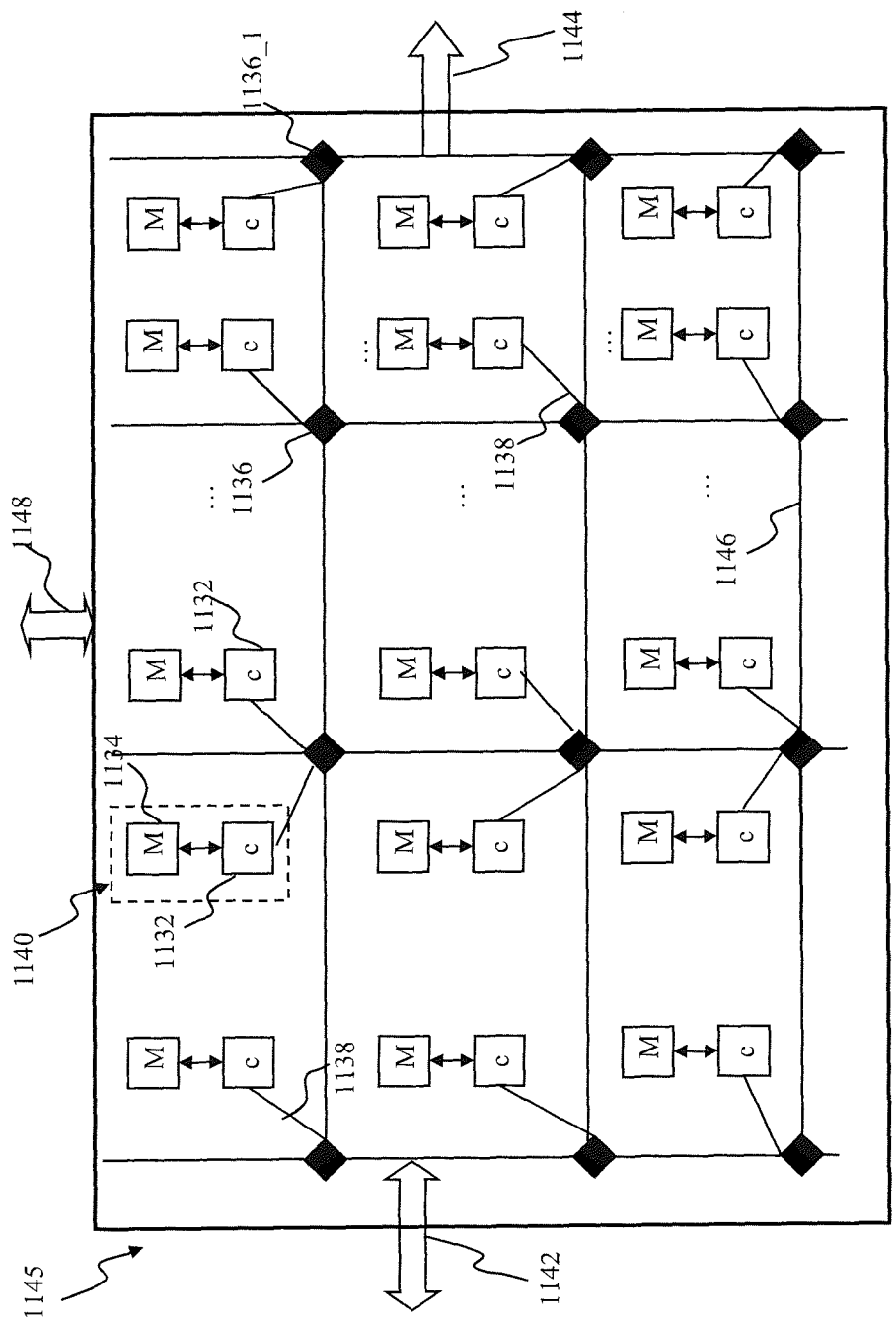
FIG. 11C is a block diagram illustrating a hierarchical neuromorphic computerized system architecture useful with, inter alia, adaptive plasticity mechanism in a spiking network, in accordance with one implementation.

FIG. 11C illustrates implementations of a shared bus neuromorphic computerized system comprising micro-blocks 1140, described with respect to FIG. 11B, supra, coupled to a shared interconnect. The apparatus 1145 of FIG. 11C utilizes one (or more) shared bus(es) 1146 in order to interconnect micro-blocks 1140 with one another.

Figure 11D:
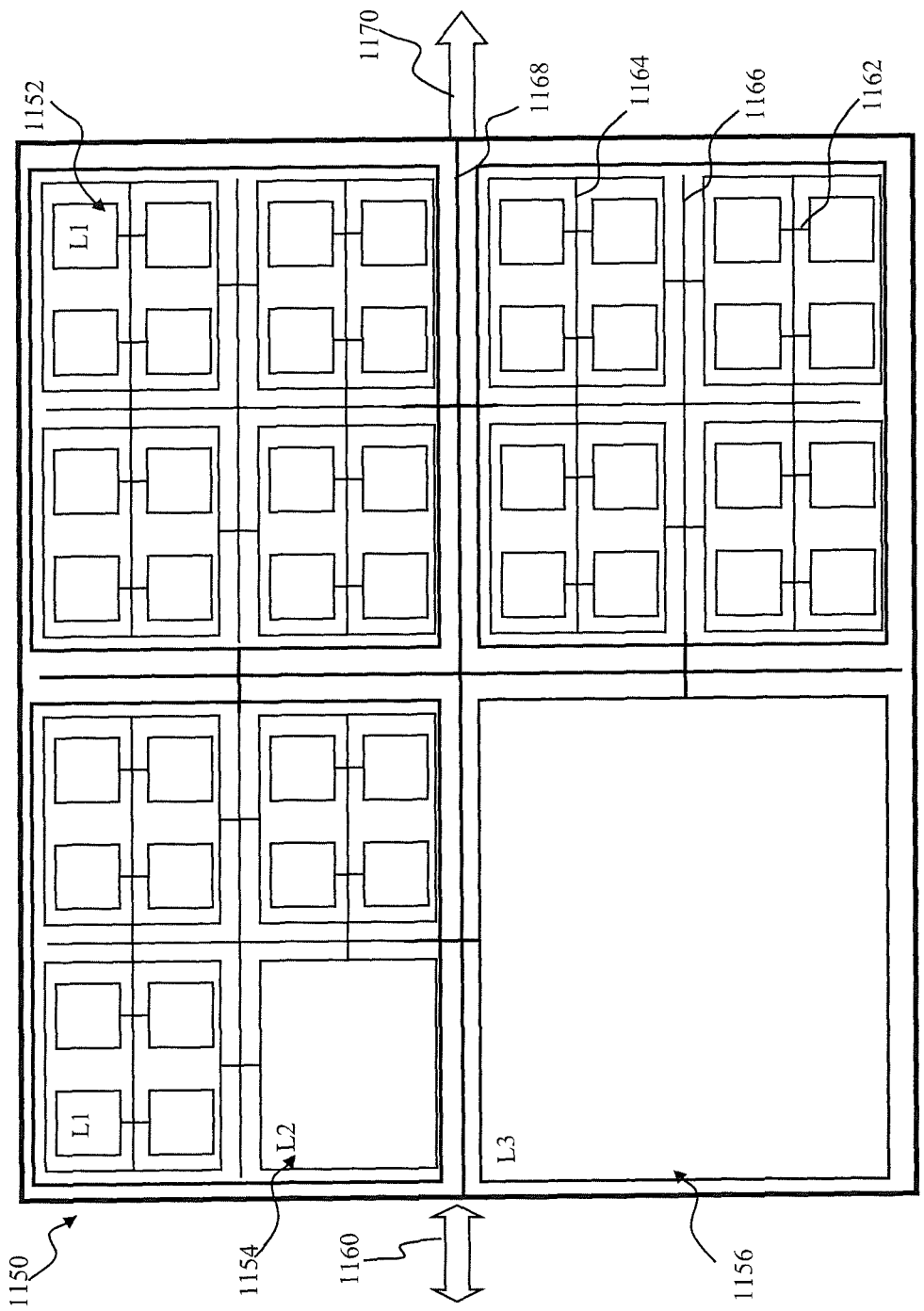
FIG. 11D is a block diagram illustrating a cell-type neuromorphic computerized system architecture useful with, inter alia, adaptive plasticity mechanism in a spiking network, in accordance with one implementation.

FIG. 11D illustrates one implementation of cell-based neuromorphic computerized system architecture configured to implement activity based plasticity mechanism in a spiking network. The neuromorphic system 1150 of FIG. 11D comprises a hierarchy of processing blocks (cells block). In some implementations, the lowest level L1 cell 1152 of the apparatus 1150 may comprise logic and memory, and may be configured similar to the micro block 1140 of the apparatus shown in FIG. 11B. A number of cell blocks may be arranges in a cluster and communicate with one another a local interconnects 1162, 1164. Each such cluster may form a higher-level cell, e.g., cell L2, denoted as 1154 in FIG. 11D. Similarly, several L2 clusters may communicate with one another via a second-level interconnect 1166 and form a super-cluster L3, denoted as 1156 in FIG. 11D. The super-clusters 1154 may for example communicate via a third level interconnect 1168, and may form a next level cluster, and so on. It will be appreciated by those skilled in the arts that the hierarchical structure of the apparatus 1150, comprising a given number (e.g., four) cells per level, is merely one exemplary implementation, and other implementations may comprise more or fewer cells per level, and/or fewer or more levels, as well as yet other types of architectures.

Different cell levels (e.g., L1, L2, L3) of the exemplary apparatus 1150 of FIG. 11D may be configured to perform functionality with various levels of complexity. In one implementation, different L1 cells may process in parallel different portions of the visual input (e.g., encode different frame macro-blocks), with the L2, L3 cells performing progressively higher-level functionality (e.g., edge detection, object detection). Different L2, L3 cells may also perform different aspects of operating for example a robot, with one or more L2/L3 cells processing visual data from a camera, and other L2/L3 cells operating a motor control block for implementing lens motion when e.g., tracking an object, or performing lens stabilization functions.

The neuromorphic apparatus 1150 may receive input (e.g., visual input) via the interface 1160. In one or more implementations, applicable for example to interfacing with a computerized spiking retina or image array, the apparatus 1150 may provide feedback information via the interface 1160 to facilitate encoding of the input signal.

The neuromorphic apparatus 1150 may provide output (e.g., an indication of recognized object or a feature, or a motor command, e.g., to zoom/pan the image array) via the interface 1170. In some implementations, the apparatus 1150 may perform all of the I/O functionality using single I/O block (not shown).

The apparatus 1150, in one or more implementations, may also interface to external fast response memory (e.g., RAM) via high bandwidth memory interface (not shown), thereby enabling storage of intermediate network operational parameters (e.g., spike timing, etc.). The apparatus 1150 may also interface to external slower memory (e.g., flash, or magnetic (hard drive)) via lower bandwidth memory interface (not shown), in order to facilitate program loading, operational mode changes, and retargeting, where network node and connection information for a current task is saved for future use and flushed, and a previously stored network configuration is loaded in its place.

Exemplary Uses and Applications of Certain Aspects of the Disclosure

Plasticity of inhibitory connections between two or more neurons receiving feed-forward stimulus may be modulated based on a similarity measure between output of the two or more neurons. The similarity measure may comprise a dynamically determined cross-correlogram between the output spike trains of two neurons. An a priori configured similarity measure may be used during network operation in order to update efficacy of inhibitory connections between neighboring neurons. Correlated output activity may cause one neuron to inhibit output generation by another neuron thereby hindering responses by multiple neurons to the same input stimuli. The inhibition may be based on an increased efficacy of inhibitory lateral connection. The inhibition may comprise modulation of the pre synaptic portion the plasticity rule based on efficacies of feed-forward connection and inhibitory connections and a statistical parameter associated with the post-synaptic rule.

Neuron networks of the prior art may fail to develop feature selectivity, as illustrated. Advantageously, activity-based plasticity modulation may advantageously cause the receptive fields of different neurons to develop selectivity to the different features, as illustrated in FIG. 9B.

The plasticity mechanism described herein may advantageously improve the quality of the feature learning (as characterized by a number of false positives) and/or to increase learning speed. The adaptive plasticity mechanism may enable the processing apparatus to learn temporally stable patterns.

Various aspects of the disclosure may advantageously be applied to, inter alia, the design and operation of large spiking neural networks configured to process streams of input stimuli, in order to aid in detection and functional binding related aspect of the input.

In some implementations, activity-based and/or plasticity modulation mechanisms described herein may be implemented in a spiking neuron of a network, or in a connection of the network.

The approach of the disclosure can advantageously, among other things, achieve faster learning and improve the quality of learned features and (iv) enable efficient network operation (e.g., visual input encoding) for a wide variety of input conditions. It will be appreciated that the increased network stability and flexibility may be traded for (a) a less complex, less costly and more robust network capable of processing the same feature set with fewer neurons; and/or (b) a more capable, higher performance network capable of processing larger and more complex feature set with the same number of neurons, when compared to the prior art solutions.

It is appreciated by those skilled in the arts that above implementation are exemplary, and the framework of the disclosure is equally compatible and applicable to processing of other information, such as, for example information classification using a database, where the detection of a particular pattern can be identified as a discrete signal similar to a spike, and where coincident detection of other patterns influences detection of a particular one pattern based on a history of previous detections in a way similar to an operation of exemplary spiking neural network.

Advantageously, exemplary implementations of the various aspects of the present innovation are useful in a variety of devices including without limitation prosthetic devices, autonomous and robotic apparatus, and other electromechanical devices requiring sensory processing functionality. Examples of such robotic devises are manufacturing robots (e.g., automotive), military, medical (e.g. processing of microscopy, x-ray, ultrasonography, tomography). Examples of autonomous vehicles include rovers, unmanned air vehicles, underwater vehicles, smart appliances (e.g. ROOMBA®), etc.

Implementations of the principles of the disclosure are applicable to video data compression and processing in a wide variety of stationary and portable devices, such as, for example, smart phones, portable communication devices, notebook, netbook and tablet computers, surveillance camera systems, and practically any other computerized device configured to process vision data Implementations of the principles of the disclosure are further applicable to a wide assortment of applications including computer human interaction (e.g., recognition of gestures, voice, posture, face, etc.), controlling processes (e.g., an industrial robot, autonomous and other vehicles), augmented reality applications, organization of information (e.g., for indexing databases of images and image sequences), access control (e.g., opening a door based on a gesture, opening an access way based on detection of an authorized person), detecting events (e.g., for visual surveillance or people or animal counting, tracking), data input, financial transactions (payment processing based on recognition of a person or a special payment symbol) and many others.

Advantageously, the disclosure can be used to simplify tasks related to motion estimation, such as where an image sequence is processed to produce an estimate of the object position (and hence velocity) either at each points in the image or in the 3D scene, or even of the camera that produces the images. Examples of such tasks are: ego motion, i.e., determining the three-dimensional rigid motion (rotation and translation) of the camera from an image sequence produced by the camera; following the movements of a set of interest points or objects (e.g., vehicles or humans) in the image sequence and with respect to the image plane.

In another approach, portions of the object recognition system are embodied in a remote server, comprising a computer readable apparatus storing computer executable instructions configured to perform pattern recognition in data streams for various applications, such as scientific, geophysical exploration, surveillance, navigation, data mining (e.g., content-based image retrieval). Myriad other applications exist that will be recognized by those of ordinary skill given the present disclosure.

What is claimed:

1. A method of object recognition by a computerized spiking neuron network comprising first and second spiking neurons, the method comprising, for a signal comprising first and second representations of first and second objects, respectively:

based on a first response by the first neuron to a representation of at least one of the first and the second objects:

potentiating a first feed-forward connection delivering the signal to the first neuron; and incrementing an inhibition indication for the second neuron; and based on a second response by the second neuron to the representation of at least one of the first and the second objects:

depressing a second feed-forward connection delivering the signal to the second neuron; and incrementing an inhibition indication for the first neuron.

2. The method of claim 1, wherein the second response is configured to be delayed based on the inhibition indication for the second neuron being above a response generation threshold.

3. The method of claim 1, wherein:

the second response occurs subsequent to the first response;

the potentiating, the depressing, and the incrementing the inhibition indication of the first neuron and the second neuron cooperate to enable:

the first neuron developing a first receptive field characterized by an increased probability of the first neuron detecting the first object representation in an input; and the second neuron developing a second receptive field characterized by an increased probability of the second neuron detecting the second object representation in an input.

4. Computerized spiking neuron apparatus comprising a storage medium, the storage medium comprising a plurality of executable instructions being configured to, when executed, adjust efficacy of an interface of a neuron by at least:

determination of a pre-synaptic plasticity rule for the interface based on at least:

a parameter associated with a post-synaptic plasticity rule for the interface;

an inhibitory efficacy associated with an output activity of another neuron; and the efficacy of the interface; and based on at least an output generated by the neuron responsive to a feed-forward stimulus, adjust the efficacy of the interface based on at least one of the post-synaptic rule and the pre-synaptic rule.

5. The apparatus of claim 4, wherein:

the interface is configured to provide the feed-forward stimulus to the neuron; and the inhibitory efficacy is based on at least a similarity measure between the output of the neuron and the output activity of the another neuron, the output activity generated based on at least the feed-forward stimulus.

6. The apparatus of claim 5, wherein:

the similarity measure comprises a histogram characterized by a plurality of time interval bins;

the output activity of the another neuron is characterized by one or more neighbor activity times; and a bin count of the histogram is determined based on individual ones of the one or more neighbor activity times falling within the respective time interval bin.

7. The apparatus of claim 5, wherein:

the similarity measure is characterized by a plurality of time interval bins;

the output activity of the another neuron is characterized by one or more neighbor activity times; and the inhibitory efficacy is incremented based on: (i) a number of individual ones of the one or more neighbor activity times falling within the respective time interval bin; and (ii) a weight of the similarity measure associated with the respective time interval bin.

8. The apparatus of claim 5, wherein:

the similarity measure is determined based on one or more of (i) a correlogram measure; (ii) a cross-correlation measure; (iii) a convolution measure; (iv) a de-convolution measure; and (v) mutual information measure between the output of the neuron and the output activity of the another neuron.

9. The apparatus of claim 4, wherein:

the interface is configured to provide the feed-forward stimulus to the neuron; and the inhibitory efficacy is based on at least a similarity measure between the output of the neuron and the output activity of the another neuron, the output of the neuron and the output activity of the another neuron being generated based on at least another feed-forward stimulus preceding the feed-forward stimulus.

10. The apparatus of claim 4, wherein:

the interface is configured to provide the feed-forward stimulus to the neuron; and the inhibitory efficacy is based on at least a similarity measure between the output of the neuron and the output activity of the another neuron, the similarity measure being determined prior to the provision of the feed forward stimulus.

11. The apparatus of claim 4, wherein:

the pre-synaptic plasticity rule comprises a proportional component and an incremental component;

the proportional component is based on the parameter associated with the post-synaptic plasticity rule for the interface; and the incremental component is based on a combination of the inhibitory efficacy and the efficacy of the interface.

12. The apparatus of claim 4, wherein:

the inhibitory efficacy is configured to effectuate at least one of: (i) reduction of a probability of generation of a post-synaptic response by the neuron based on a feed-forward input; and/or (ii) a delay of the generation of the post-synaptic response by the neuron based on the feed-forward input.

13. The apparatus of claim 4, wherein:

the post-synaptic rule is configured to increase the interface efficacy; and the pre-synaptic rule is configured to decrease the interface efficacy.

14. The apparatus of claim 13, wherein:

the interface efficacy is characterized by a probability of transmission;

the post-synaptic rule is characterized by a first time-dependent function having a first time window associated therewith; and the efficacy increase comprises an increase of the probability based at least on an integral of the first function over a first interval comprising a positive value.

15. The apparatus of claim 14, wherein:

the pre-synaptic rule is characterized by a second time-dependent function having a second time window associated therewith; and the interface efficacy decrease comprises a decrease of the probability based at least on an integral of the first function over the first interval comprising a negative value.

16. The apparatus of claim 13, wherein:

the interface efficacy is characterized by a weight configured to affect the output activity of the another neuron;

the pre-synaptic rule is characterized by a time-dependent function having a time window associated therewith; and the efficacy decrease comprises a decrease of the weight based on an integral of the function over an interval being negative.

17. The apparatus of claim 13, wherein the interface efficacy decrease is configured to hinder post-synaptic response by the neuron.

18. The apparatus of claim 4, wherein:
the post-synaptic rule is configured to increase the interface efficacy by a first amount;
the pre-synaptic rule is configured to increase the interface efficacy by a second amount; and
a ratio of the second amount to the first amount being selected from the range between 0.25 and 4, inclusive.

19. The apparatus of claim 4, wherein:
the inhibitory efficacy is configured to:
be incremented when the output of the neuron is preceded by the output activity of the another neuron within a time window; and
decrease with time, the decrease characterized by an inhibition time scale;
the inhibition time scale configured between 5 and 30 ms, the time window configured between 1 and 100 ms; and
the adjustment of the interface efficacy is characterized by a plasticity time scale, the plasticity time scale being greater than the inhibition time scale.

20. A computerized spiking neuron network sensory signal processing system, comprising:
one or more processors configured to execute computer program modules, the execution of the computer program modules configured to cause the one or more processors, based on a response by a neuron of the network, to adjust one or more connections capable of providing input to the neuron by at least:
incrementing an inhibitory trace based on at least a similarity measure between an output of the neuron comprising the response, and an output of another neuron; and
depressing at least one of the one or more connections based on at least a non-zero similarity measure and a positive increment of the inhibitory trace.

* * * * *